US010802149B2

(12) United States Patent
Stettner et al.

(10) Patent No.: US 10,802,149 B2
(45) Date of Patent: *Oct. 13, 2020

(54) LADAR ENABLED IMPACT MITIGATION SYSTEM

(71) Applicant: Continental Advanced Lidar Solutions US, LLC, Carpinteria, CA (US)

(72) Inventors: Roger Stettner, Santa Barbara, CA (US); Patrick Gilliland, Santa Barbara, CA (US); Barton Goldstein, Santa Barbara, CA (US); Andrew Duerner, Goleta, CA (US)

(73) Assignee: Continental Advanced Lidar Solutions US, LLC, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,087

(22) Filed: Feb. 28, 2019

(65) Prior Publication Data

US 2019/0196021 A1    Jun. 27, 2019

Related U.S. Application Data

(63) Continuation of application No. 14/813,591, filed on Jul. 30, 2015, now Pat. No. 10,295,670, which is a (Continued)

(51) Int. Cl.
*B60G 17/018* (2006.01)
*G01S 17/931* (2020.01)
(Continued)

(52) U.S. Cl.
CPC .......... *G01S 17/931* (2020.01); *B60G 17/019* (2013.01); *B60R 1/00* (2013.01);
(Continued)

(58) Field of Classification Search
CPC ...... G01S 17/936; G01S 17/89; G01S 17/026; G01S 17/023; G01S 7/486; B60G 17/019;
(Continued)

(56) References Cited

U.S. PATENT DOCUMENTS 5,446,529 A * 8/1995 Stettner ................. G01S 7/4863
250/332
5,629,524 A * 5/1997 Stettner ................. G01T 1/2018
250/370.09
(Continued)

FOREIGN PATENT DOCUMENTS

DE    4119494 A1    1/1992
DE    10107273 A1   8/2002
(Continued)

*Primary Examiner* — Shardul D Patel

(57) ABSTRACT

A collision mitigation system makes use of ladar sensors to identify obstacles and to predict unavoidable collisions therewith, and a duplex radio link in communication with secondary vehicles, and a number of external airbags deployable under the control of an airbag control unit, to reduce the forces of impact on the host vehicle, secondary vehicles, and bipeds and quadrupeds wandering into the roadway. A suspension modification system makes use of ladar sensors to identify road hazards, and make adaptations to a number of active suspension components, each with the ability to absorb shock, elevate or lower the vehicle, and adjust the spring rate of the individual wheel suspensions.

20 Claims, 15 Drawing Sheets

Related U.S. Application Data continuation of application No. 13/791,180, filed on Mar. 8, 2013, now Pat. No. 9,110,169.

(51) Int. Cl.

| | | |
|---|---|---|
| B60R 21/013 | (2006.01) | |
| B60G 17/019 | (2006.01) | |
| B60R 21/0134 | (2006.01) | |
| B60R 21/36 | (2011.01) | |
| G01S 7/486 | (2020.01) | |
| G01S 17/04 | (2020.01) | |
| G01S 17/86 | (2020.01) | |
| B60R 1/00 | (2006.01) | |
| G08G 1/16 | (2006.01) | |
| B60R 21/01 | (2006.01) | |
| G01S 17/89 | (2020.01) | |

(52) U.S. Cl.
CPC ........ *B60R 21/013* (2013.01); *B60R 21/0134* (2013.01); *B60R 21/36* (2013.01); *G01S 7/486* (2013.01); *G01S 17/04* (2020.01); *G01S 17/86* (2020.01); *G08G 1/166* (2013.01); *B60R 2021/01013* (2013.01); *G01S 17/89* (2013.01)

(58) Field of Classification Search
CPC ......... B60R 21/013; B60R 1/00; B60R 21/36; B60R 21/0134; B60R 2021/01013; G08G 1/166
USPC ..... 701/1, 28, 45–47, 70, 36, 37; 340/457.2; 356/4.01
See application file for complete search history.

(56) References Cited

U.S. PATENT DOCUMENTS

| | | | | |
|---|---|---|---|---|
| 5,696,577 A | * | 12/1997 | Stettner | G01S 7/4863 250/332 |
| 5,959,552 A | | 9/1999 | Cho | |
| 6,133,989 A | * | 10/2000 | Stettner | G01S 7/4816 250/332 |
| 6,362,482 B1 | * | 3/2002 | Stettner | G01T 1/1644 250/370.08 |
| 6,414,746 B1 | * | 7/2002 | Stettner | G01S 7/4816 250/332 |
| 8,031,062 B2 | * | 10/2011 | Smith | G08G 1/166 340/438 |
| 9,110,169 B2 | * | 8/2015 | Stettner | B60R 1/00 |
| 10,295,670 B2 | * | 5/2019 | Stettner | B60R 1/00 |
| 2002/0117340 A1 | * | 8/2002 | Stettner | B60G 17/019 180/169 |
| 2004/0107033 A1 | | 6/2004 | Rao et al. | |
| 2004/0118624 A1 | | 6/2004 | Beuhler et al. | |
| 2006/0082110 A1 | | 4/2006 | Gaboury et al. | |
| 2008/0234900 A1 | | 9/2008 | Bennett | |
| 2010/0328644 A1 | | 12/2010 | Lu et al. | |
| 2013/0162477 A1 | | 6/2013 | Waters et al. | |

FOREIGN PATENT DOCUMENTS

| | | |
|---|---|---|
| EP | 2026246 A1 | 2/2009 |
| GB | 2151872 A | 7/1985 |
| GB | 2389342 A | 12/2003 |
| JP | H0725357 A | 1/1995 |
| JP | H7167954 | 7/1995 |
| JP | H07320963 A | 12/1995 |
| JP | H1198707 A | 4/1999 |
| JP | 2003151092 A | 5/2003 |
| JP | 2005238992 A | 9/2005 |
| JP | 2006273262 A | 10/2006 |
| JP | 200876390 | 4/2008 |
| JP | 2009143435 A | 7/2009 |
| JP | 201137308 | 2/2011 |
| WO | 2004021546 A2 | 3/2004 |
| WO | 2007081628 A1 | 7/2007 |
| WO | 2007148462 A1 | 12/2007 |

\* cited by examiner

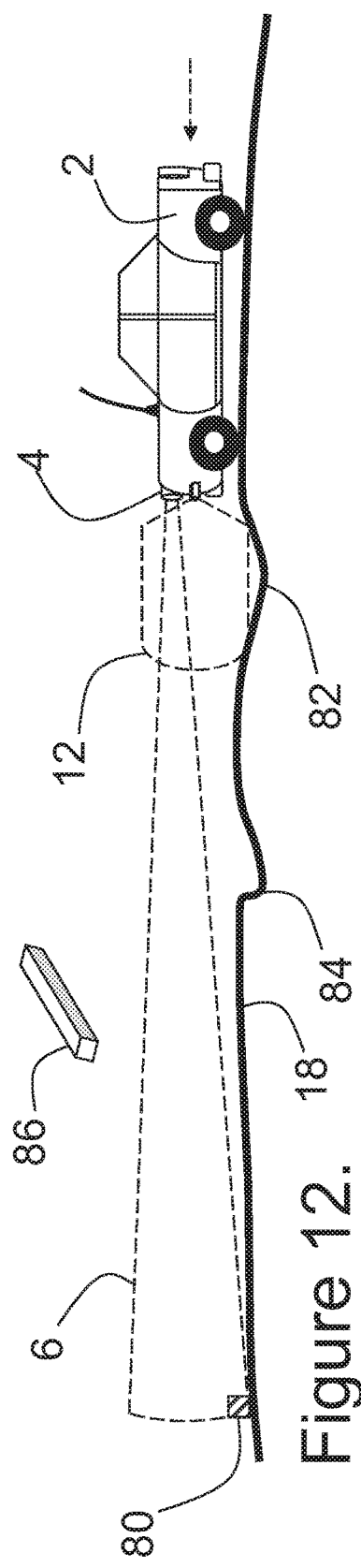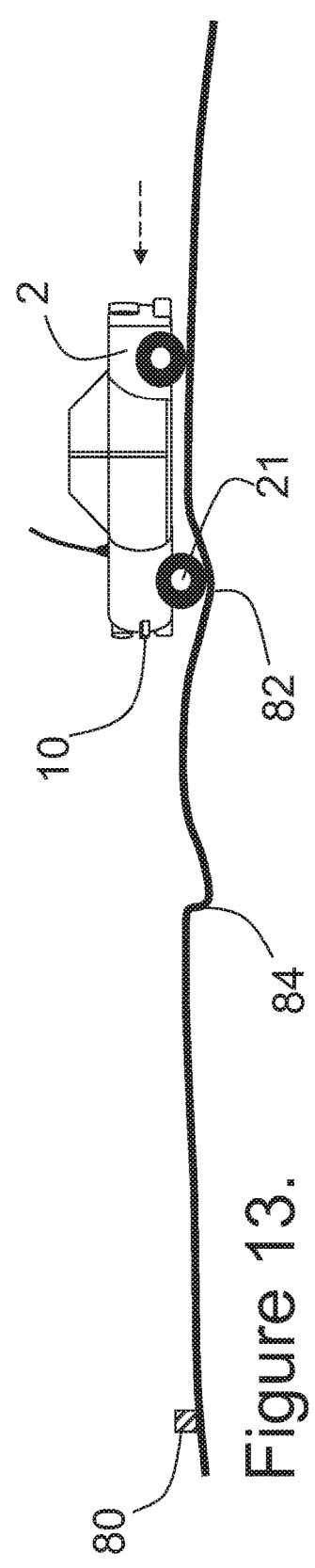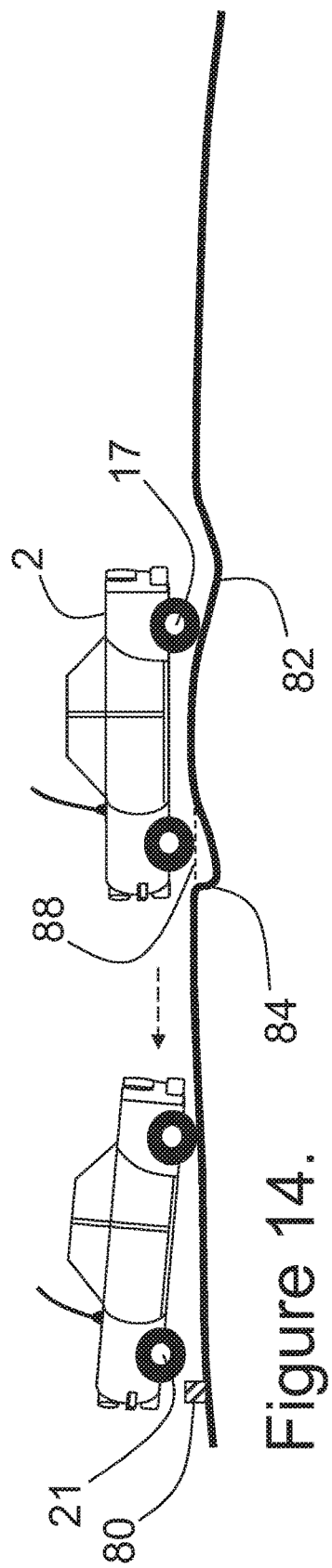

LADAR ENABLED IMPACT MITIGATION SYSTEM

REFERENCE TO RELATED APPLICATIONS

This application is a continuation of application Ser. No. 14/813,591, filed on Jul. 30, 2015, which is a continuation of application Ser. No. 13/791,180 filed on Mar. 8, 2013, now U.S. Pat. No. 9,110,169, the disclosure of each is incorporated herein by reference.

FIELD

The embodiments disclosed herein relate generally to 3-D image generation and the identification of objects, tracking of objects, road hazard avoidance, and impact mitigation.

BACKGROUND

Many systems have been proposed to meet the challenge of using optical imaging and video cameras in a vehicle system to create 3-D maps of scenes and models of solid objects, and to use the 3-D database to navigate, steer, and avoid collisions with stationary or moving objects. Stereo systems, holographic capture systems, and those which acquire shape from motion, have all been proposed and in some cases demonstrated, but what is lacking is a system with the capability of rapidly capturing 3-D images of objects and roadway features in the path of a moving vehicle, or travelling on an intersecting path, and which controls and adapts the host vehicle so as to avoid collisions and road hazards, steer the best path, while at the same time mitigating the impact and damage associated with any unavoidable collisions.

The 3-D imaging technology disclosed in Stettner et al, U.S. Pat. Nos. 5,446,529, 6,133,989 and 6,414,746 provides with a single pulse of light, typically pulsed laser light, all the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data which enables a processor to calculate the round-trip time of flight of the laser pulse to reflective features on the object of interest. Each smart pixel also collects data associated with the returning laser pulse shape and magnitude. One value of these flash LADAR sensors, as opposed to competing designs in which one or more pixels is scanned over the field of view, is the elimination of the precision mechanical scanner, which is costly, high maintenance and typically large and heavy. The pixels in the focal plane of a flash LADAR sensor are automatically registered due to their permanent positions within the array. Further, by capturing a frame of data as opposed to one or a few pixels with one laser pulse, the data rate is greatly increased while weight and volume are reduced. Because each frame of data is captured from the reflection of a short duration laser pulse, moving objects or surfaces of stationary objects may be captured from a moving platform without blurring or distortion.

The driver and passengers of an automobile are exposed to dangers from other vehicles and a number of road hazards. In some cases, a crash is unavoidable if the danger is presented suddenly, or the speed is too high to allow for a stop or an evasive maneuver. In these cases, it is important to lessen the damage caused by an impact, and to reduce the severity of the impact. In other cases, where road hazards are present, or when sudden maneuver is imminent, adjustments to the suspension of the vehicle may improve ride and driver control, and may prevent damage to the vehicle tires, suspension, and undercarriage. To provide a reference for acceleration levels during an automobile crash, a research paper is referenced, entitled "Finite Element Frontal Crash Analysis of NEV Vehicle's Platform with Upper and Sub Frame Body", by authors Byeong Sam Kim, et. al., at the Department of Automotive Engineering, Hoseo University, Asan, Korea. In this research paper the authors perform a crash analysis of the upper body and sub frame for the NEV electric car. The NEV vehicle front platform assembly behavior when subjected to a frontal crash at 30 mph is described in this article which uses a finite-element analysis to model the behavior. One model of a variable or adjustable suspension is the Citroen® combined pneumatic and hydraulic vehicle suspension which is well documented in a number of web videos, articles, and patents. An excellent multimedia web description is at: http://www.citroene-t.org.uk/miscellaneous/hydraulics/hydraulics-1.html, and a second is located at: http://www.kolumbus.fi/~w496119/xw/technica5.htm. A detailed video description of the 2013 Citroen C5 Hydractive suspension may be found at: http://www.youtube.com/watch?v=zuqJPurdRJw. A new type of electromagnetic suspension based on years of development by Bose is located at: http://www.extremetech.com/extreme/97177-bose-active-suspension-moves-toward-market/2, and a video presentation may be viewed at: http://www.youtube.com/watch?v=Lyf4rfT7bHU&feature=related. Finally, a comparative discussion of active/semi-active suspensions may be found at: http://www.autozine.org/technical_school/suspension/tech_suspension3.htm. These references together give a context for the present invention, and supply background information on the operation of the adaptive and active suspension systems being developed by the automobile industry.

BRIEF SUMMARY

Automobile occupants are exposed to dangers from other vehicles and road hazards. A crash may be unavoidable if the danger is presented suddenly, or if speed is too high to allow for a stop or an evasive maneuver. In these cases, it is important to lessen the damage caused by an impact, and to reduce the severity of the impact. It is therefore desirable to provide a system which uses a flash LADAR to generate 3D data describing objects and obstacles in the path of the automobile, and a vehicle reaction capability to deploy airbags to mitigate the effects of impact, and to make adjustments to the vehicle suspension which may enhance driver control, improve ride, and avoid damage to the tires, suspension, and undercarriage of the vehicle. If more than one vehicle is involved in the imminent collision, radio or infrared communication may be established between the vehicles, and the steering and braking systems of one or both of the cars may be activated to alter the impact from a head-on collision to an oblique, or glancing impact, thus minimizing the rate of energy dissipated in an impact. The prototypical system is mounted in a motor vehicle and may synthesize 3-D solid object models from data supplied by multiple ladar sensors and conventional 2D video cameras with overlapping fields of view.

The embodiments disclosed herein provide a system for crash mitigation, object and obstacle recognition and avoidance, and ride and steering control improvements. The benefits are realized through the use of a 3-D imaging facility, comprising a vehicle mounted ladar system with an object detection and recognition capability, an external airbag deployment system, and a ride and suspension modification system. The vehicle mounted ladar system may comprise a number of independent ladar sensors connected to a central ladar system controller which synthesizes the available data from each of the independent ladar sensors into a composite 3D map of the area in the path of the vehicle and in some cases, in a full 360 degree arc surrounding the vehicle. In a preferred embodiment, conventional 2D still images or video sequences may be used to improve the quality of 3D solid models and scene maps. The multiple ladar sensors each have an illuminating laser module which may incorporate a semiconductor laser with a modulated laser light output, or a pulsed solid state laser, and a diffusing optic for illuminating a scene in the field of view of the modular ladar sensor. Each ladar sensor also comprises a receiver module featuring a two dimensional array of light sensitive detectors positioned at a focal plane of a light collecting and focusing assembly. The ladar sensor may be incorporated into a headlight, taillight, or other auxiliary lamp assembly. The ladar sensor may also be part of a backup light, rearview mirror assembly, or mounted behind an opening in a bumper or grill assembly. The individual ladar sensors rely on an array of light sensitive detectors positioned at a focal plane of a light collecting and focusing assembly (Focal Plane Array or FPA). Each of the light sensitive detectors has an output producing an electrical response signal from a reflected portion of the laser light output. The electrical response signals are connected to a readout integrated circuit with a corresponding array of unit cell electrical circuits. Each of the unit cell electrical circuits has an input connected to one of the light sensitive detector outputs, an electrical response signal demodulator, and a range measuring circuit connected to an output of the electrical response signal demodulator. The demodulator may be a voltage sampler and analog shift register for storing sequential samples of the electrical response signals, or it may comprise a mixer, integrator, or matched filter. The demodulation may also take place external to the readout integrated circuit, by a fast digital processor operating on a sequence of digitized samples from each pixel. The fast digital processor may employ algorithms which utilize weighted sums of sequential analog samples, or use fast Fourier transforms, convolution, integration, differentiation, curve fitting, or other digital processes on the digitized analog samples of the electrical response. The fast digital processor may also employ algorithms which isolate or segment the roadway from other objects and objects from each other. Such objects may be automobiles, bicycles, motorcycles, trucks, persons, animals, walls, signs, road obstructions etc. These algorithms may compute position and orientation, as well as object velocity. Objects, their orientation, position and velocity may be transferred to a central computer for further processing and decision making. The unit cell may also incorporate a trigger circuit, set to produce an output response when the output of the demodulator exceeds a preset threshold. The range measuring circuit is further connected to a reference signal providing a zero range reference for the modulated laser light output. The individual ladar sensor may also incorporate a detector bias circuit connected to a voltage distribution grid of the detector array and a temperature stabilized frequency reference. In some collision scenarios, both vehicles may be equipped with a radio link and may exchange information including position, velocity, vehicle weight, system status, etc., and may cooperatively interact to reduce the impact of a collision and lessen the destructive forces on the vehicles and occupants therein.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 7A shows a partial cutaway view of the internal construction of an electrically activated gas venting valve;

FIG. 12 is a diagram showing a motor vehicle equipped with ladar sensors and an impact mitigation system of the present type, and several types of common road hazards;

FIG. 13 is a diagram showing the passive adaption capability of the motor vehicle suspension of a preferred embodiment;

FIG. 14 is a diagram showing the active adaption capability of the motor vehicle suspension of a preferred embodiment;

DETAILED DESCRIPTION

Figure 1:
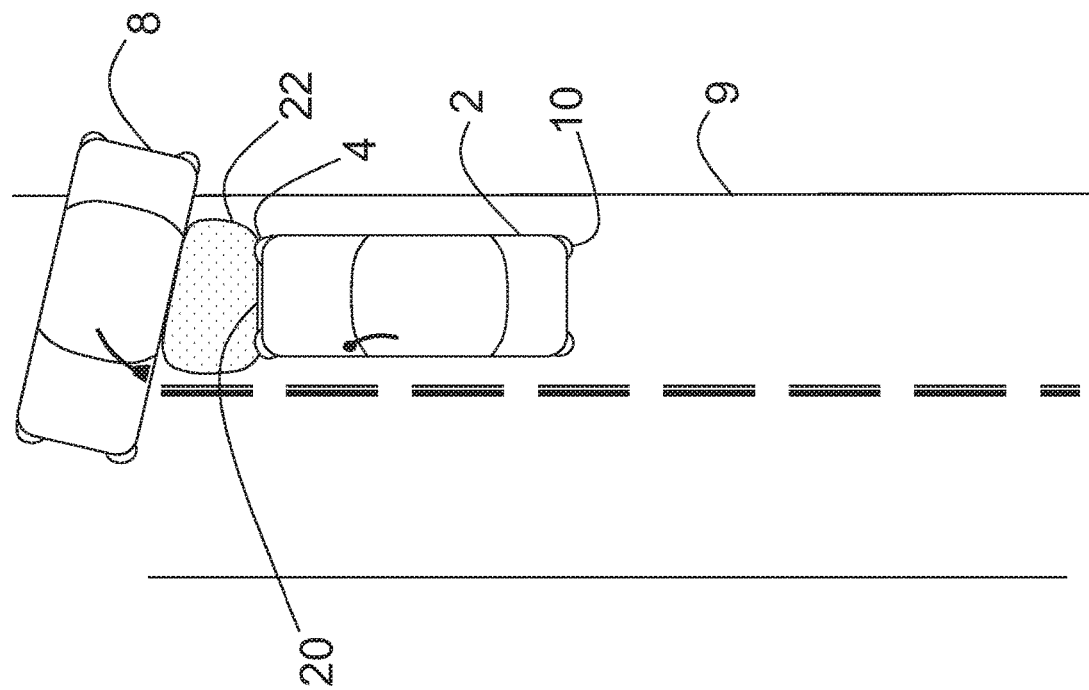
FIG. 1 is a diagram of a typical collision threat scenario with a first vehicle approaching a second vehicle which has spun out on the road ahead.

This application contains new subject matter related to previous U.S. Pat. Nos. 5,696,577, 6,133,989, 5,629,524, 6,414,746, 6,362,482, D463,383, and U.S. patent application Ser. No. 10/066,340 filed on Jan. 31, 2002 and published as US 2002/0117340 A1, the disclosures of which are incorporated herein by reference.

The present invention is an impact mitigation system enabled by a vehicle mounted ladar imaging system. The impact mitigation can be an airbag deployment, or a maneuver designed to reduce peak forces between vehicles, or to crash as safely as possible. The system may also adapt the suspension of the vehicle so as to maintain traction on an irregular road surface, or to avoid dangerous obstacles in the roadway. Each ladar imaging system typically consists of multiple vehicle mounted ladar sensors. Each ladar sensor may have a system control processor with frequency reference and inertial reference, a system memory, a pulsed laser transmitter, transmit optics, receive optics, an array of light detecting elements positioned at a focal plane of the receive optics, a detector bias converter for supplying bias voltage to the light detecting focal plane array, a readout integrated circuit, analog-to-digital converter circuits for producing digital image data from the analog readout IC outputs, a data reduction processor for adjusting and correcting the image data, and an object tracking processor for segregating, isolating, identifying, and tracking features and objects in the corrected image database. When paired with an intelligent vehicle system controller with external airbags systems and active suspension controls, a substantial reduction in collision damage, and less frequent and severe damage to the undercarriage of the vehicle is expected. Each pixel in a focal plane array (FPA) of the preferred ladar sensor converts impinging laser light into an electronic signal whose magnitude is sampled in time and stored in memory within the pixel. Each pixel also uses a clock to time the samples being taken in response to the captured reflection of the laser light from a target surface. A preferred embodiment may include a two way radio/IR link between vehicles, over which raw data, processed data, image data, object data, or commands may be shared as way of creating a cooperative least damage impact path for both vehicles. The ladar sensor typically incorporates a hybrid assembly of focal plane array and readout integrated circuit, and the readout IC is arranged as an array of unit cell electrical circuits, and each unit cell is arranged to be in an array of identical spacing and order as the mating focal plane array. The ladar sensor in a preferred embodiment is capable of working in a flash mode as described above, or in a multi-pulse mode, or in a pulsed continuous-wave mode as the situation dictates. The impact mitigation system incorporating the ladar sensor has a number of features which enable full 3D object modeling and tracking, as well as scene enhancements derived from the merging of 2D and 3D data bases and managing of both 3D ladar sensors and conventional 2D video cameras.

FIG. 1 depicts a first embodiment of the impact mitigation system installed on a first vehicle 2 involved in a collision threat scenario with a second vehicle 8, which is spunout and stationary in the roadway ahead. The forward radiation pattern 6 of a long range ladar sensor embedded in a headlight assembly of first vehicle 2 is shown by dashed lines where it intersects with the driver's side of second vehicle 8, which is positioned laterally across the lane and the right edge of the roadway 9. Second vehicle 8 obstructs part of the second lane of traffic, but does not extend over the left edge of the roadway 18. A second forward radiation pattern 7 from a second long range ladar sensor embedded in a second headlight assembly is shown overlapping first radiation pattern 6. The radiation pattern 12 of a short range ladar sensor embedded in an auxiliary lamp assembly is shown projecting radially from a corner of first vehicle 2 and also at the other three corners of first vehicle 2. First vehicle 2 also has a radio antenna 14 for communicating with second vehicle 8 which also has a radio antenna 16 for receiving radio communications and transmitting responses. Communication may also take the form of optical pulses.

Figure 2:
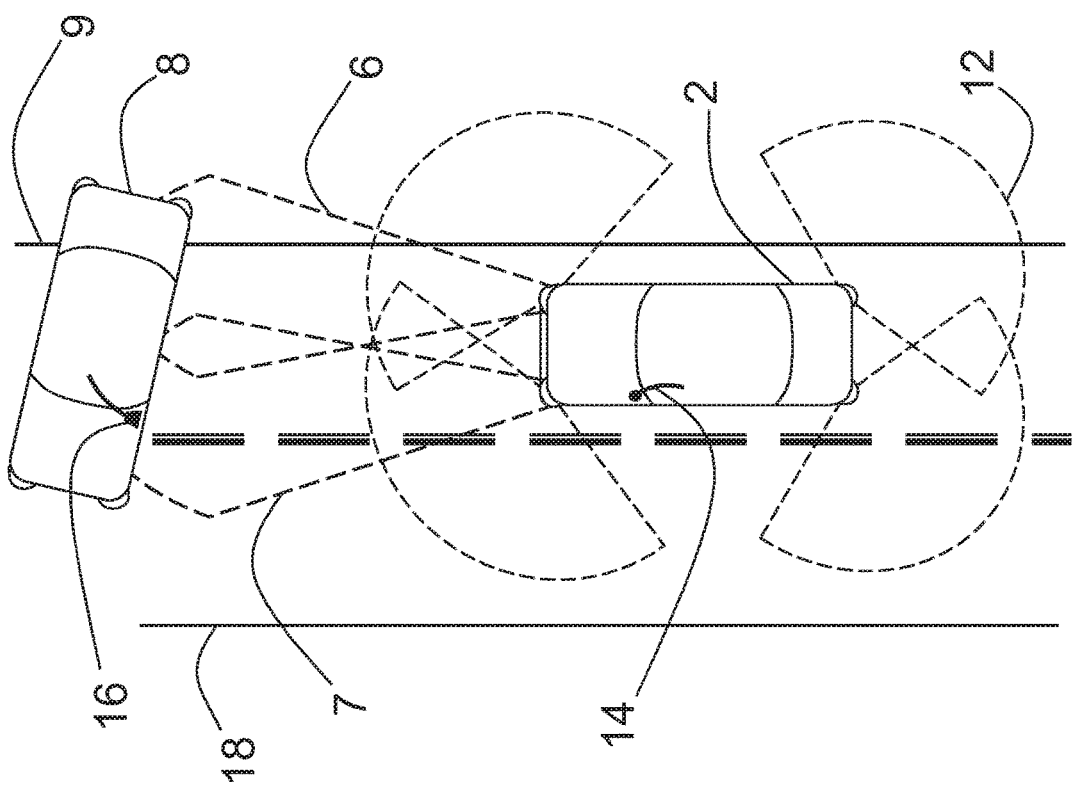
FIG. 2 is a diagram of an unavoidable collision in process wherein an external airbag deploys from a first vehicle to lessen the peak impact forces on a second vehicle.

FIG. 2 shows the evolution of FIG. 1 in a situation where first vehicle 2 is unable to stop in time to avoid a collision with second vehicle 8. This scenario could easily evolve on a rain-slickened or icy roadway, or in the case of a second vehicle 8 emerging from a blind alley perpendicular and to the right of the roadway edge 9. The headlight assembly 4 containing a long range ladar sensor is shown on first vehicle 2. Also shown is the auxiliary lamp assembly 10 containing a short range ladar sensor typically positioned at the four corners of first vehicle 2. An external airbag 22 has been deployed from airbag panel 20 mounted in the front bumper area of first vehicle 2. The first vehicle 2 has determined an impact is likely from analyzing object data developed from an array of available data, including long range and short range ladar sensors, video/still cameras, GPS or relative position references, and two way communications with second vehicle 8, and has deployed airbag 22 to reduce the closing speed between the vehicles in an unavoidable impact. It is also possible that second vehicle 8 by means of a side sensor could detect the danger and deploy an external side air bag. The situation would be similar to FIG. 2.

Figure 3:
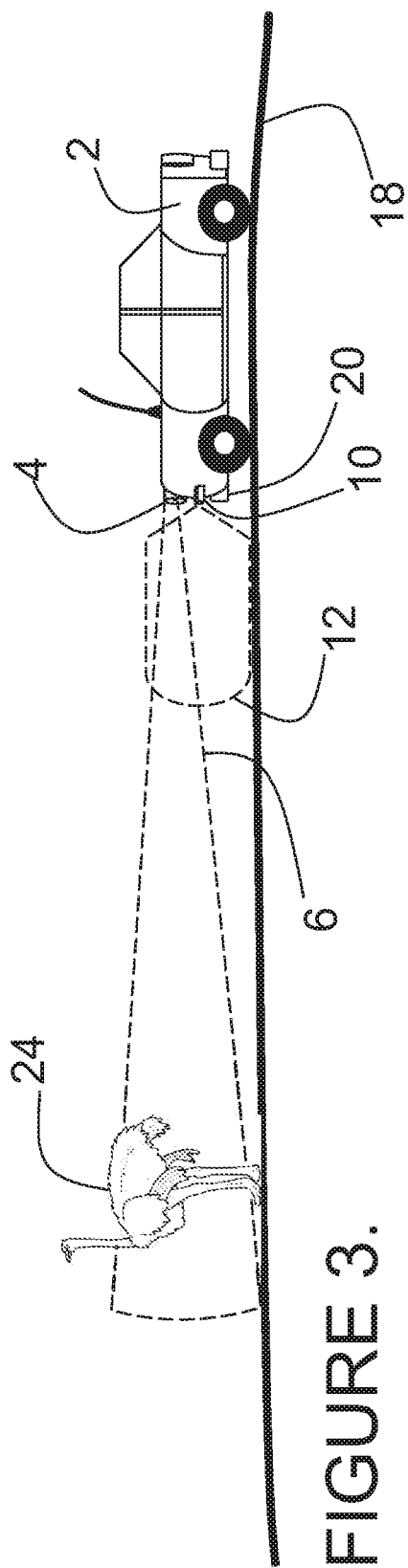
FIG. 3 shows a second type of collision threat scenario with a vehicle approaching a biped crossing a thoroughfare in the direct path of the vehicle.

FIG. 3 shows a collision threat scenario involving first vehicle 2 and a biped 24 in the roadway 18 ahead. Seen from a side view, first vehicle 2 has a conical radiation pattern 6 emanating from a long range ladar sensor embedded in headlight assembly 4, for example, and which illuminates biped 24 and returns range data sufficient to create a 3D model. The 3D range data derived from the reflections of the modulated laser light allows for some object identification to take place in a processor of the impact mitigation system installed on first vehicle 2. Short range radiation pattern 12 issues from a short range ladar sensor which is embedded in auxiliary lamp assembly 10, and covers the ground immediately in front of first vehicle 2. Auxiliary lamp assembly 10 in this diagram is embedded in a corner mounted turn signal, as depicted in FIG. 1. An airbag system is contained in airbag panel 20 located in the front bumper of first vehicle 2.

Figure 4:
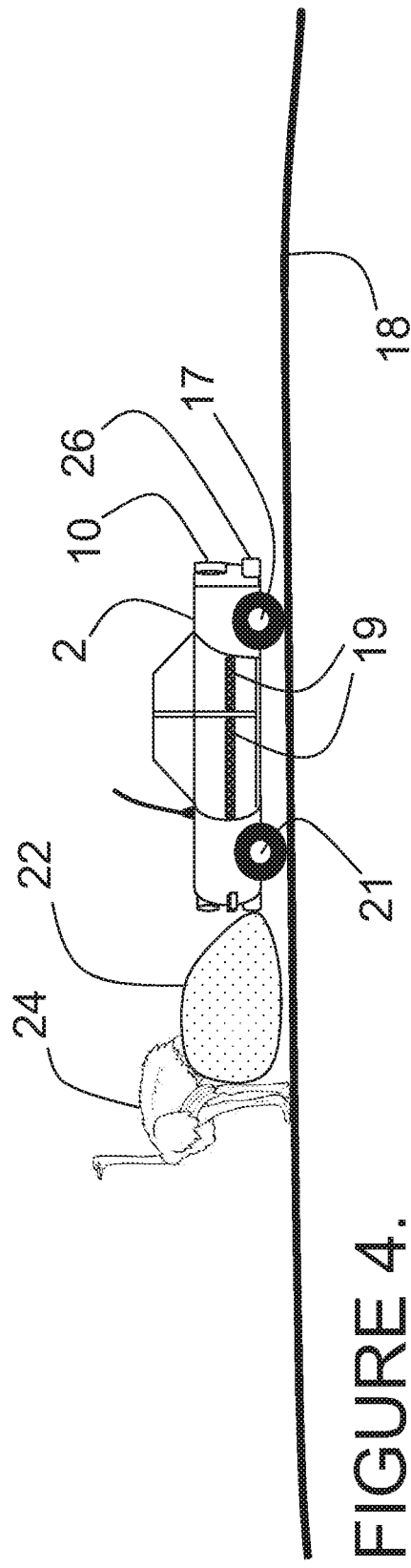
FIG. 4 shows the evolution of FIG. 3, as a second type of unavoidable collision wherein an external airbag deploys from a vehicle to lessen the peak impact forces on a biped.

FIG. 4 shows a side view of the moment of impact between first vehicle 2 and biped 24. Airbag 22 is fully deployed and ready to absorb the impact to reduce damage to the vehicle 2 and to soften the blow delivered to biped 24. Front wheel 21 may actively lower to prevent the possibility of first vehicle 2 knocking biped 24 over and running over it or dragging it. Rear wheel 17 may lower as well, or may remain in position. Also shown is auxiliary lamp assembly 10, a tail light in this case, which may have a short range ladar sensor embedded. Ladar sensors may be mounted at many points on the vehicle 2; door panels, rear view mirrors, bumpers, etc. Rear bumper 26 and door panels 19 may also have external airbag systems as well which may be activated in the event of a rear or side impact to first vehicle 2.

Figure 5:
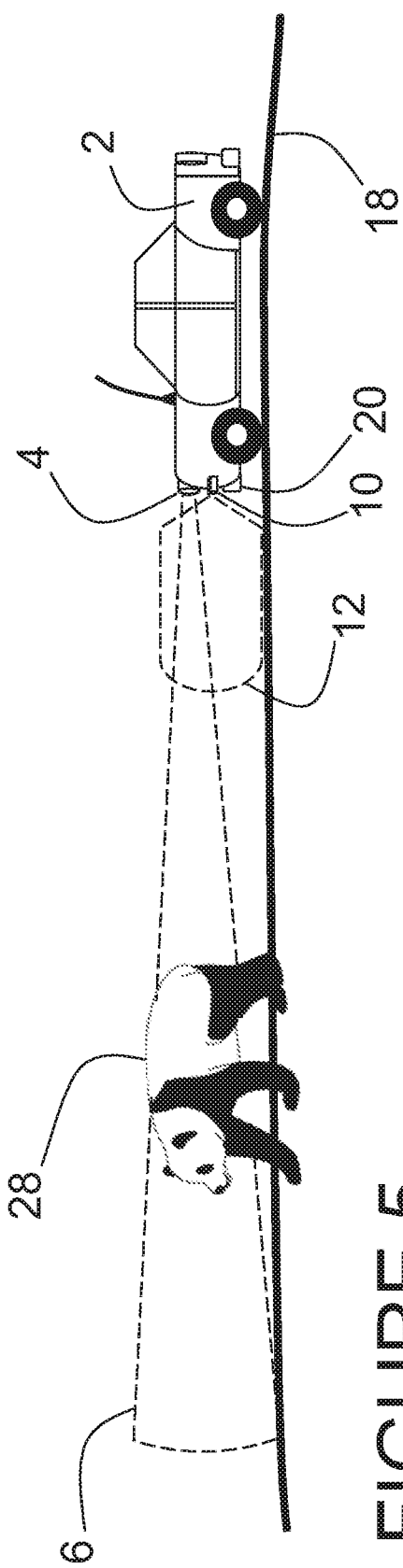
FIG. 5 shows a third type of collision threat scenario with a vehicle approaching a quadruped crossing a thoroughfare in the direct path of the vehicle.

FIG. 5 shows a collision threat scenario involving first vehicle 2 and a quadruped 28 in the roadway 18 ahead. Seen from a side view, first vehicle 2 has a conical radiation pattern 6 emanating from a long range ladar sensor embedded in headlight assembly 4, and which illuminates quadruped 28 and returns range data sufficient to create a 3D model. The 3D range data derived from the reflections of the modulated laser light allows for some object identification to take place in a processor of the impact mitigation system installed on first vehicle 2. Short range radiation pattern 12 issues from a short range ladar sensor which is embedded in auxiliary lamp assembly 10, and covers the ground immediately in front of first vehicle 2. Auxiliary lamp assembly 10 in this diagram is a corner mounted turn signal. An airbag system is contained in airbag panel 20 located in the front bumper of first vehicle 2.

Figure 6:
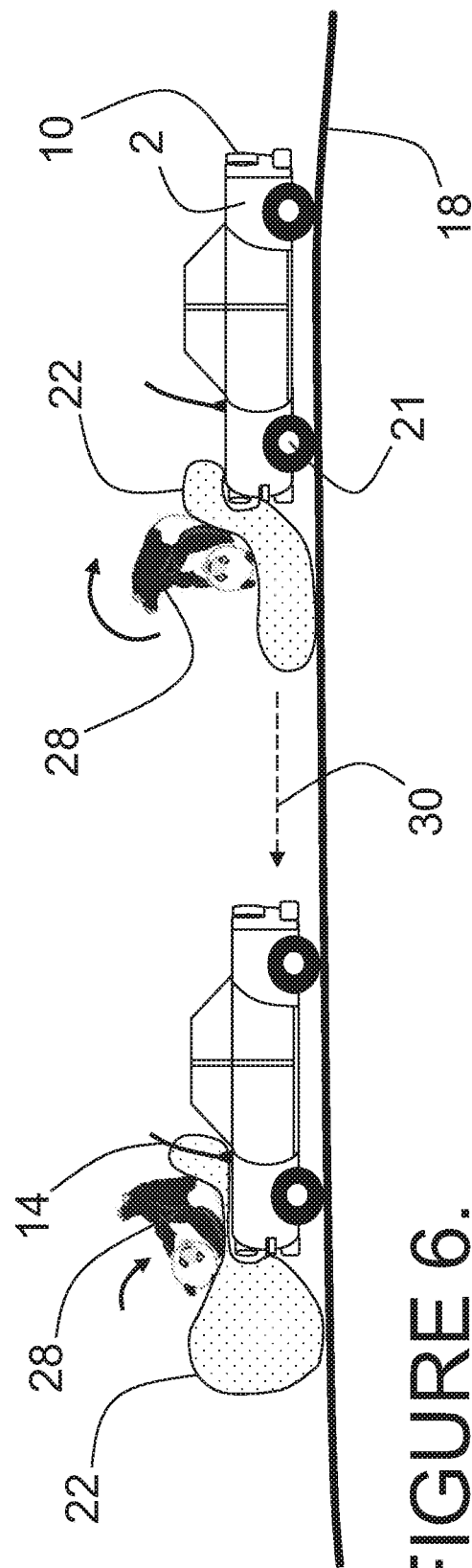
FIG. 6 shows a third type of unavoidable collision wherein an external airbag deploys from a vehicle to lessen the peak impact forces on a quadruped.

FIG. 6 at far right shows a side view of the moment just after impact between first vehicle 2 and quadruped 28 has been upended and is rotating. Airbag 22 is fully deployed and has been deployed in a manner to ensure quadruped 28 is not run over and dragged by first vehicle 2. The external airbag 22 has been fully vented to minimize the impact on quadruped 28. Front wheel 21 suspension may actively compress and lower the front of vehicle 2, so as to prevent the possibility of vehicle 2 knocking quadruped 28 over and running over it or dragging it. Also shown is auxiliary lamp assembly 10, a taillight in this case, which may have a short range ladar sensor embedded. First vehicle 2 travels forward in the direction of arrow 30. At the left of FIG. 6, the collision has evolved a bit further, with the quadruped 28 fully rotated into a back-down position, resting on the hood of vehicle 2 without crushing antenna 14.

Figure 7:
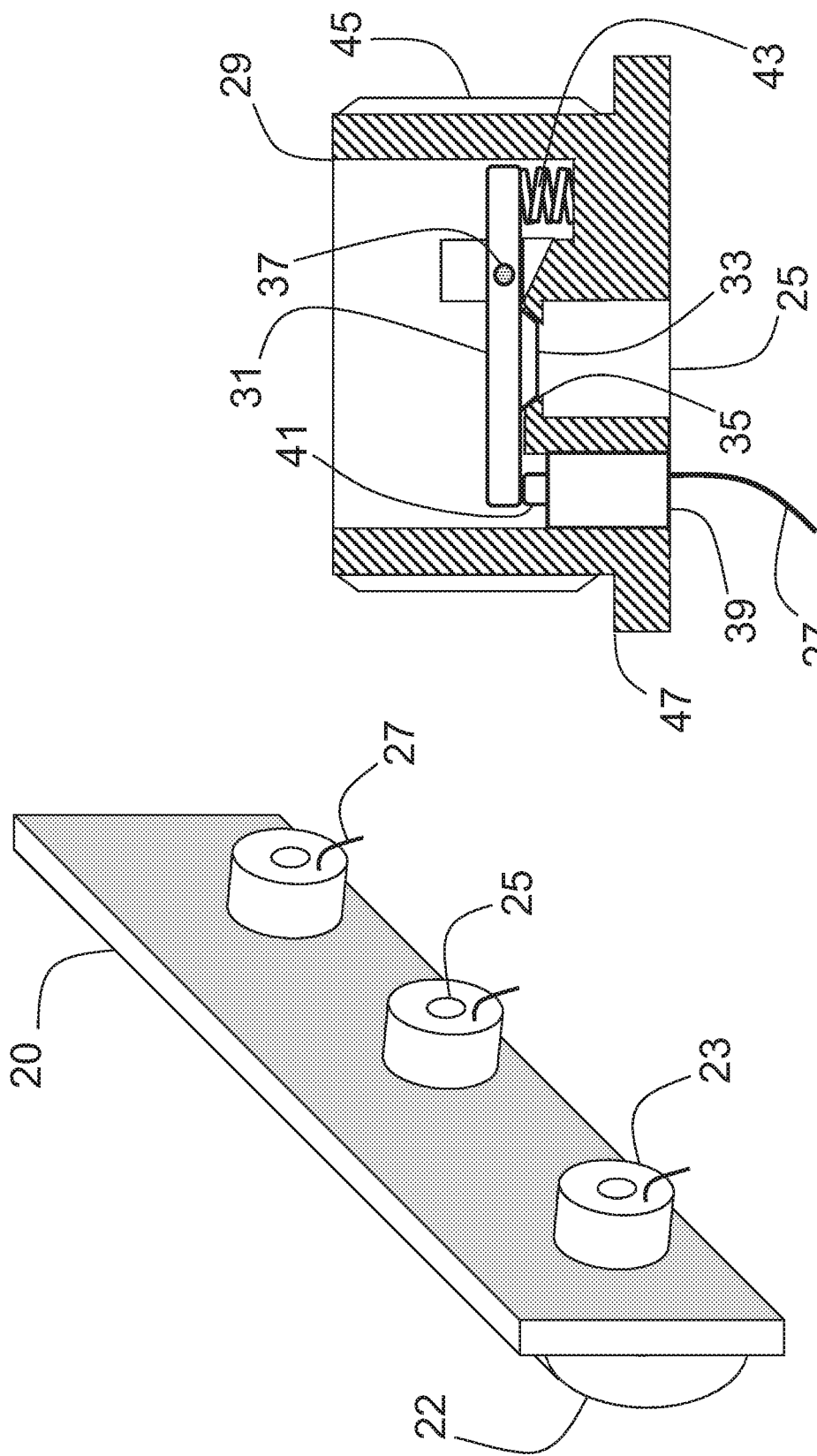
FIG. 7 shows a diagram of an externally deployable airbag unit having a switchable gas venting system, and suitable for mounting in a front bumper area of an automobile.

FIG. 7 shows an isometric view of an airbag panel 20 with an external airbag 22 compacted and stored thereon, and having a series of remotely actuated solenoid valves 23 mounted thereto. Each of the solenoid valves 23 has a switchable air passageway with an exit aperture 25 and electrical connections 27. In the case of a full frontal collision with a second vehicle 8, the air passageways would be closed, and maximum energy absorption is the result. In the case of a collision with a biped 24 or quadruped 28, the valves may be opened by the first vehicle 2 once the onboard computer processors recognize the type of object which is likely to be impacted. To adjust the gas flow resistance of the external airbag 22, 1, 2, or 3 valves may be opened, depending on the size and density characteristic of the identified object. FIG. 7A is a partial cutaway of a solenoid valve 23 showing the internal working elements. The overall shape is a cylindrical plug which may be mounted to panel 20 by screwing threaded section 45 into airbag panel 20 until shoulder 47 stops the advance. An air or gas passageway inlet 29 communicates with an exit air or gas passageway 25 interrupted by clapper valve 31 which rotates on pivot 37. A fail-safe spring 43 forces the clapper valve 31 shut when electrical power is lost, or when solenoid 39 is stuck or non-operational. Valve seats 35 are machined to mate with the tapered section 33 of clapper 31. A solenoid type magnetic actuator 39 with a linear moving plunger 41 opens the clapper valve 31 when an electric current is applied through electrical connections 27.

Figure 8:
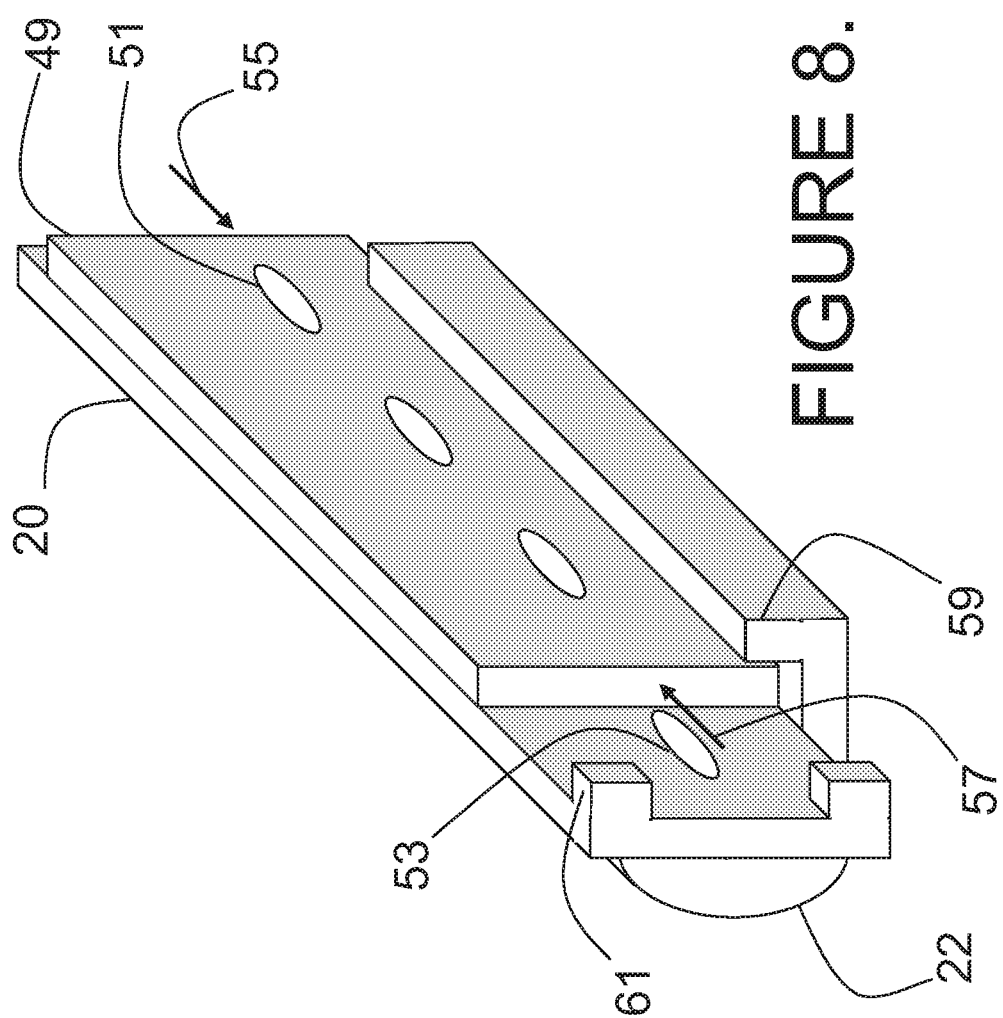
FIG. 8 is a partial cutaway view of a continuously variable gas venting system using a slide and overlapping slots.

FIG. 8 is another embodiment of a gas venting system for the external airbag 22. Airbag panel 20 is configured with a series of slots 53 which may be covered by solid sections of sliding plate 49, or opened to a partially open position when the slots 51 and 53 are partially overlapping. A maximum gas venting aperture is created by the fully open position when the slots 51 of sliding plate 49 are directly atop the slots 53 of airbag panel 20. A U-shaped channel 59 at the bottom of airbag panel 20 guides sliding plate 49, and holds it in position to act as a variable gas valve for venting external airbag 22 after deployment. A second U-shaped channel (not shown) at the top of airbag panel 20 retains and guides sliding plate 49, and retains it in position to be effective as a variable aperture gas valve. A mechanical stop 61 keeps sliding plate 49 from traversing beyond the fully closed position. A spring force 55 from a failsafe spring (not shown) keeps sliding plate 49 pressed against mechanical stop 61 in normal operation, and the vents fully closed. In the event of an anticipated collision with a biped 24 or quadruped 28, a linear force 57 from a linear actuator such as an electromagnetic solenoid (not shown), moves the sliding plate 49 open to the degree selected by the onboard airbag control unit. The ability to vent the external airbag 22 with a continuously variable exit aperture formed by a plurality of overlapping slots 51 and 53 gives the airbag control unit a degree of freedom necessary to prevent injury to bipeds 24 and quadrupeds 28 appearing suddenly in the roadway, while maintaining the maximum airbag force for other vehicle-only type collisions.

The operations of the external airbag system are conceptually simple; a central airbag control unit (ACU) monitors the ladar sensors and a number of other sensors within the vehicle 2, including accelerometers, impact sensors, side (door) pressure sensors, wheel speed sensors, gyroscopes, brake pressure sensors, and seat occupancy sensors. When the requisite threshold conditions have been reached or exceeded, the airbag control unit will trigger the ignition of a gas generator propellant to rapidly inflate the airbag envelope. As the vehicle 2 collides with another vehicle or obstacle and compresses the bag, the gas escapes in a controlled manner through venting holes. The airbag volume and the size of the vents may be tailored to each vehicle 2, to spread out the deceleration of the vehicle 2, and thereby limit the forces of impact on the vehicle 2. The signals from the various sensors are fed into the airbag control unit (118 in FIG. 16), which determines from them the projected angle of impact, the severity, or force of the crash, and other variables. Depending on the result of these calculations, the ACU 118 may also deploy internal occupant restraint devices, such as seat belt pre-tensioners, internal airbags (including front internal airbags for driver and front passenger, along with seat-mounted side internal airbags, and "curtain" airbags which cover the side glass). Each external airbag 22 as well as internal occupant restraint device is typically activated with one or more pyrotechnic devices, commonly called an initiator or electric match. The electric match, which consists of an electrical conductor wrapped in a combustible material, activates with a current pulse between 1 to 3 amperes in less than 2 milliseconds. When the conductor becomes hot enough, it ignites the combustible material, which initiates the gas generator. In an airbag, the initiator is used to ignite solid propellant inside the airbag inflator. The burning propellant generates inert gas which may inflate an external airbag 22 in approximately 30 to 50 milliseconds. An external airbag 22 must inflate quickly in order to be fully inflated by the time the forward-traveling vehicle 2 reaches the impact zone. The decision to deploy an external airbag 22 in a frontal impact must be made 60-80 milliseconds prior to the anticipated time of the crash, so the front bumper mounted external airbag(s) 22 may be fully inflated prior to the first moment of vehicle contact.

Figure 9:
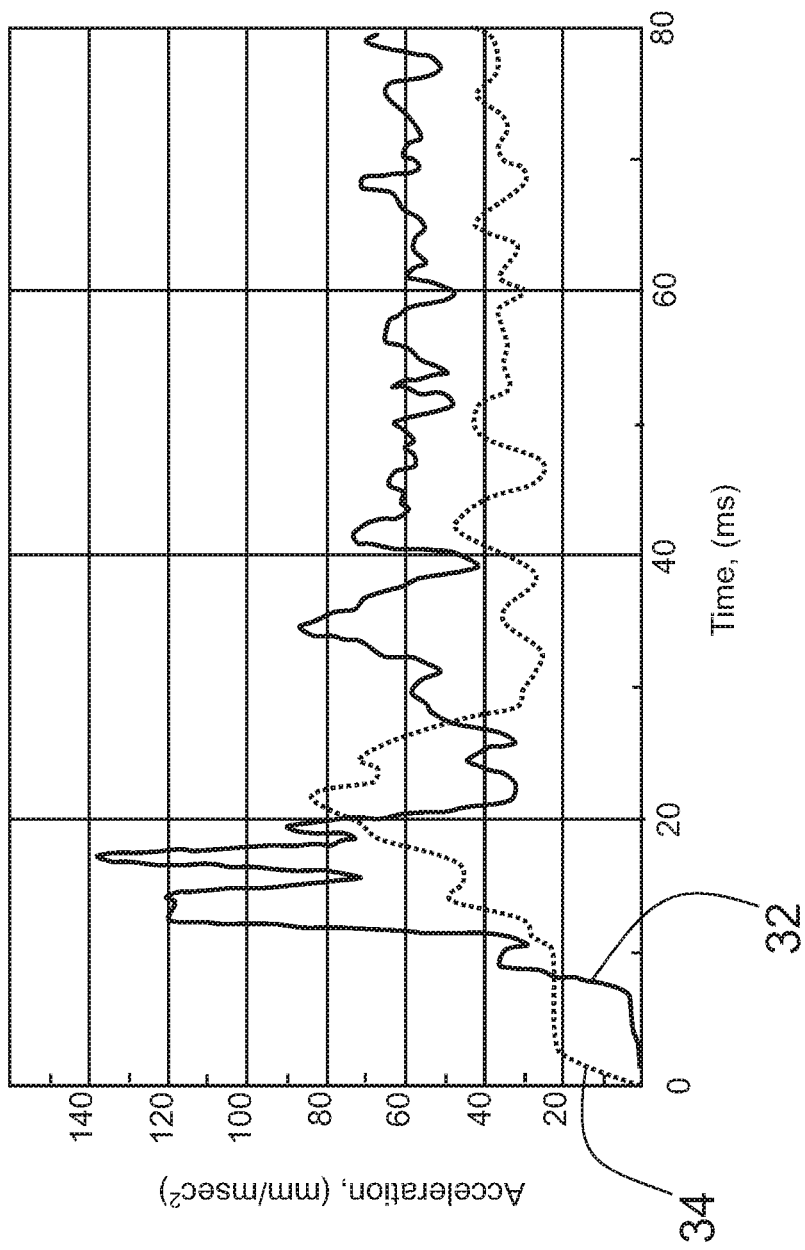
FIG. 9 is a chart with two acceleration curves, one curve for an unmitigated crash, and a second curve showing the effects of the impact mitigation system described herein.

FIG. 9 is an acceleration diagram of forces transmitted through the sub-frame and upper frame of a typical motor vehicle in a simulated crash. The results of the simulation are plotted as acceleration curve 32 in solid black lines, showing acceleration peaks in excess of 12 Gs (12 times the force of gravity, G=9.8 m/s$^2$). With the deployment of an external airbag, the expected acceleration is plotted as dotted line 34, which initiates earlier and shows acceleration peaks of approximately 8 Gs. The effect of the external airbag 22 deployment in a frontal crash is expected to be the reduction in severity of the impact as can be seen in the projected acceleration curve 34 as opposed to the original simulated acceleration 32.

Figure 10:
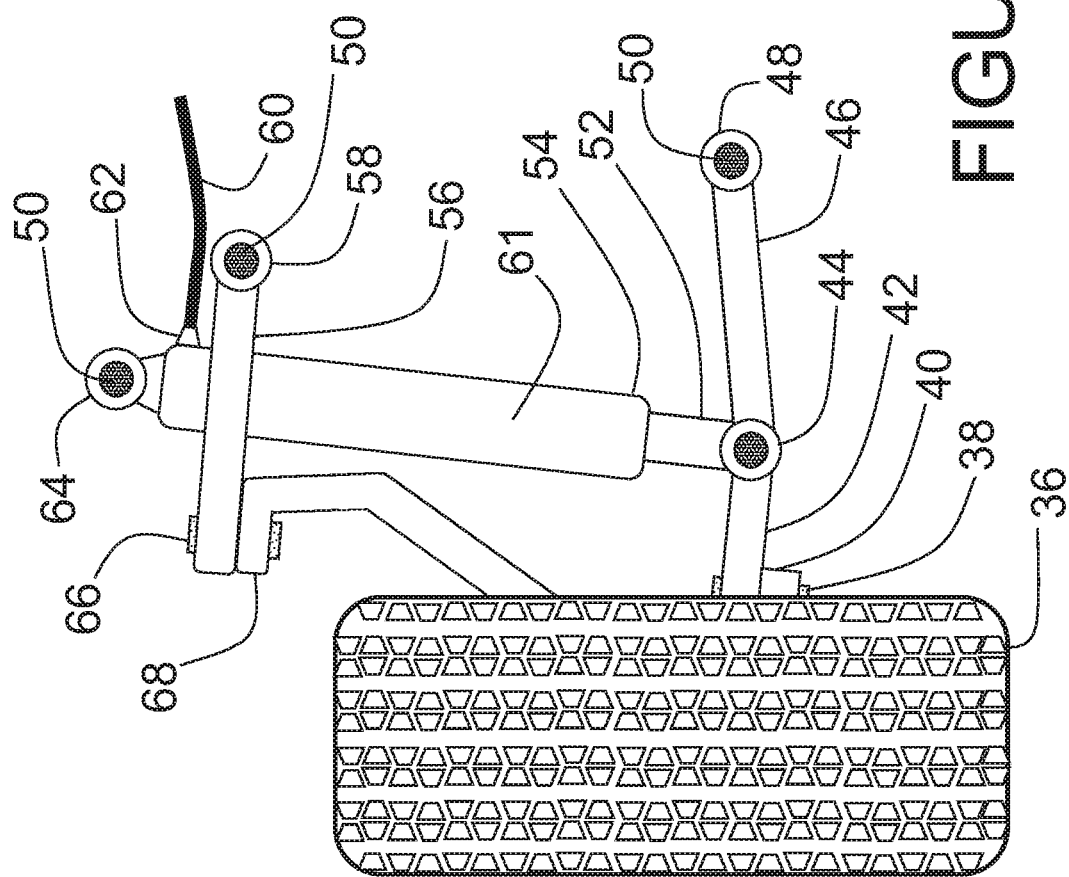
FIG. 10 is a diagram of a double wishbone type motor vehicle suspension assembly which features both passive and active road adapting capability, and with nominal ride height set by hydraulic pressure, pneumatic pressure, or by electromagnetic force.

FIG. 10 is a diagram of a suspension type common to many contemporary motor vehicles, the so-called double wishbone suspension. In this suspension type, two rigid A-arms, an upper A-arm 56, and a lower A-arm 46, support an upright 68 which carries the hub and wheel 36. The upper A-arm 56 and lower A-arm 46 are both in the shape of a wishbone, with the open end of lower A-arm 46 having a cylindrical pivot end 48 rotating about the axis of shaft 50 which attaches through the frame of the vehicle. Upper A-arm 56 also has a cylindrical pivot end 58 rotating about a second shaft 50 connected through the frame of the vehicle. The far end of the second shaft then connects to the other open end of the upper A-arm 56. The outer end of upper A-arm 56 connects to upright 68 through a pivot bearing 66. The outer end 42 of lower A-arm 46 connects to a lateral projection 40 of upright 68 through a pivot bearing 38. An active suspension component 61 comprising a cylinder 54 and piston 52 connects to lower A-arm 46 at pivot joint 44 and to the frame of the vehicle at pivot joint 64. The active suspension component 61 connects to the vehicle frame at pivot joint 64 by passing through the open end of upper A-arm 56. A fitting 62 and umbilical 60 connect to the vehicle control systems. Fitting 62 may be hydraulic, pneumatic, or electrical, and may connect to the vehicle hydraulic, pneumatic, or electrical systems, or in some embodiments to any two, or all three systems. Umbilical 60 may be an air hose, hydraulic fluid line, electrical connecting wires, or may comprise any two, or all three types of connections. None of the steering linkages are shown in the diagram of FIG. 10 for the sake of clarity. This suspension system relies on hydraulic fluid and pneumatic pressure to set the nominal ride height as in the Citroen Hydractive® suspension system. An electromagnetic linear actuator with a coil and stator housed in the body of cylinder 54 may act as an active damper. The electromagnetic linear actuator operates in a manner similar to the Bose® electromagnetic suspension described in the references and is capable of modifying the ride height, absorbing shock and converting the energy of the shock to electrical energy, and elevating the vehicle dynamically if required.

Figure 11:
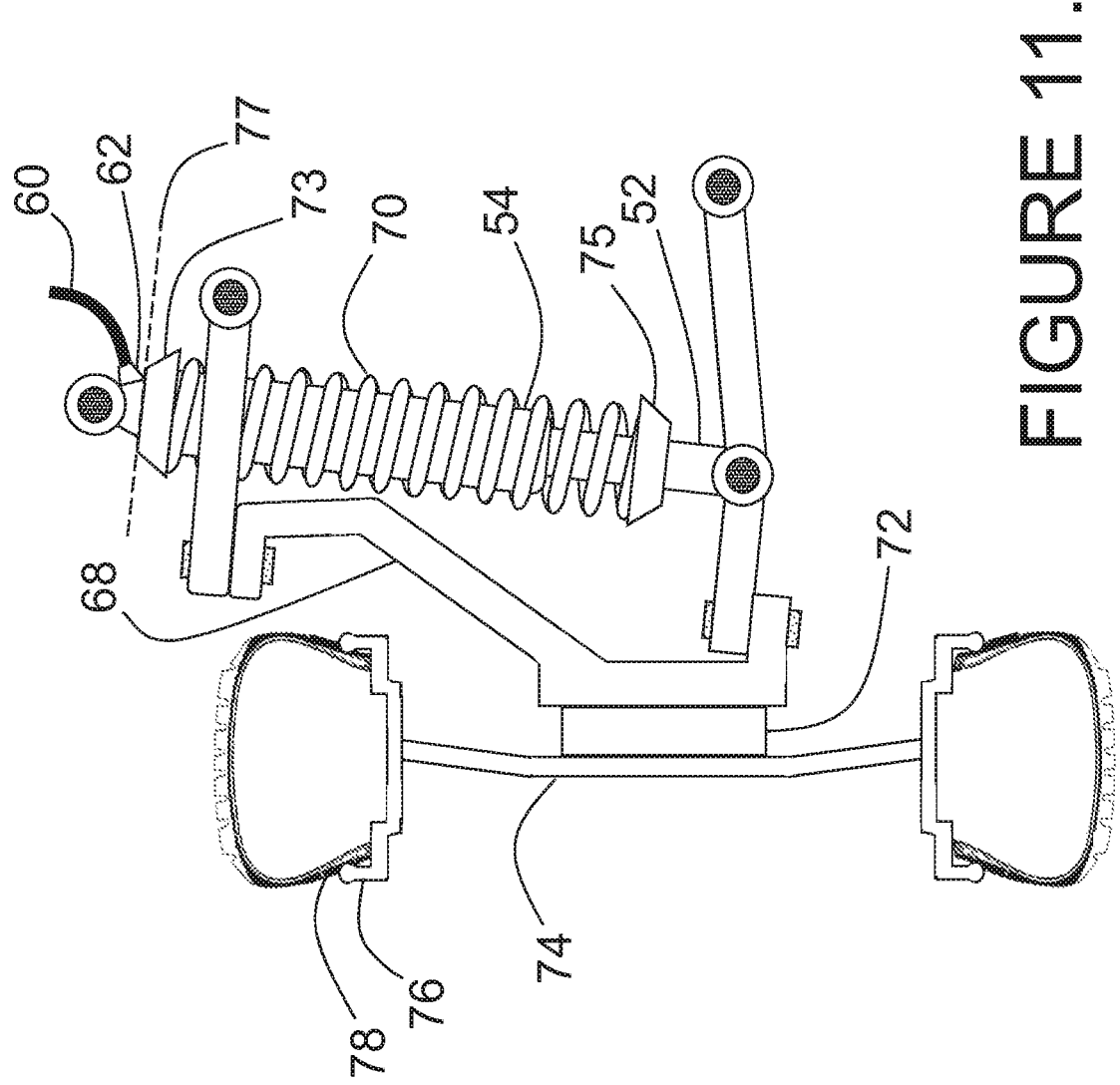
FIG. 11 is a partial cutaway view of a double wishbone type motor vehicle suspension assembly which features both passive and active road adapting capability and with nominal ride height set by a coil spring.

FIG. 11 shows a second embodiment of a variable ride suspension system with a coil spring 70 providing the nominal ride height for the vehicle. Coil spring 70 mounts coaxially over the outside diameter of cylinder 54 of active suspension component 61. The tire 78, rim 76, and wheel 74 are partially cut away to give a better view of the upright 68 and hub 72. Lower spring cup 75 is rigidly attached to piston 52 of active suspension component 61 and engages with the bottom end of coil spring 70. Upper spring cup 73 engages with the top of coil spring 70 and rests securely against the fender (not shown) of the vehicle indicated by dashed line 77. Fitting 62 is repositioned to be accessible through the fender of the vehicle, and umbilical 60 connects to the vehicle electrical, pneumatic, and/or hydraulic systems. FIG. 11 does not show any of the vehicle steering linkages in the interests of clarity.

FIG. 12 shows a road hazard scenario involving first vehicle 2 and a dip 82 in the roadway 18, a pothole 84 with an abrupt edge, and the side profile 80 of a 4"×4" stick of lumber 86 which has fallen off the back of a truck. Seen from a side view, first vehicle 2 has a conical radiation pattern 6 emanating from a long range ladar sensor embedded in headlight assembly 4 and which illuminates the 4×4 in the distance and returns range data sufficient to create a 3D model. The 3D range data derived from the reflections of the modulated laser light allows for some object identification to take place in a processor of the impact mitigation system installed on first vehicle 2. Short range radiation pattern 12 issues from a short range ladar sensor which is embedded in auxiliary lamp assembly (10 in FIG. 13) and covers the ground immediately in front of first vehicle 2. The auxiliary lamp assembly (10 in FIG. 13) in this diagram is a corner mounted turn signal, though the ladar sensor may be mounted in several other points on the vehicle. The dip 82 in the roadway 18 has been swept out by the long range ladar sensor and previously identified. Dip 82 is swept out a second time by a short range ladar sensor with a wider angle of divergence, and a decision is made by the navigation and suspension processor onboard first vehicle 2, which typically runs autonomously, and which may adapt the suspension continuously. The decision is made to adapt the vehicle suspension to maintain contact with the roadway and maintain maximum control of the vehicle 2, and the result is shown graphically in FIG. 13.

In FIG. 13, the onboard suspension control system, knowing the depth and shape of the dip 82, and the spring rate of the coil spring or compressed air bearing the vehicle load, may simply allow the suspension to passively track through the dip 82. For some types of dips 82, and some suspension characteristics, this may be an optimum solution for the stability and control of the vehicle 2. In the case of a deep dip 82, or a soft sprung vehicle suspension, it may be necessary to actively drive the left front wheel 21 lower by using an electrical impulse into an active suspension component 61 as described in association with FIGS. 10 & 11. In an alternative embodiment, hydraulic fluid under pressure may be applied to active suspension component 61, and used to drive the left front wheel 21 lower into the dip 82. In a third embodiment, an impulse of compressed air is applied to an active suspension component 61 in order to drive the left front wheel 21 lower into the dip 82 in order to maintain maximum traction and road contact. Further down the road, a pothole 84 with an abrupt edge dictates a different reaction from the active suspension system, and in the distance, 4×4 80 requires an altogether different reaction.

At the center of FIG. 14 is a side view of vehicle 2 traversing a particularly dangerous pothole 84 having an abrupt edge at the terminus. A typical passive suspension would track front wheel 21 down into the depth of the pothole 84 and then violently impact the abrupt terminal edge of the pothole 84. Rear wheel 17 also has an active suspension component 61 which has tracked through the dip 82 and is shown in the diagram still partially extended as vehicle 2 exits the dip 82. Pothole 84 has been profiled in 3D by both a long range ladar sensor embedded in headlight 10 and by a short range ladar sensor embedded in auxliary lamp 10, and is therefore well characterized, and a decision has been made to glide over the pothole 84 on a planar path 88, and thus front wheel 21 has been actively restrained from tracking down into the depression of pothole 84, and in some cases, might be partially retracted to avoid contact with the abrupt edge of pothole 84. The front wheel 21 may be actively restrained from descending by an active suspension component 61 in the suspension of the left front wheel 21 of vehicle 2. At the far left of FIG. 14, vehicle 2 is negotiating a safe path over 4×4 80, by rapidly driving front wheel 21 downward at a high enough rate to elevate the front end of vehicle 2 sufficient to clear the obstacle represented by the 4×4 80. Once the front end of vehicle 2 is slightly airborne, the front wheel 21 may be retracted upward actively by the same active suspension component 61 which is used to elevate the front end of vehicle 2, allowing front wheel 21 to clear an obstacle with a height greater than the vertical elevation of the front end of vehicle 2. A similar regimen may be employed using an active suspension component 61 in the suspension of rear wheel 17 to elevate the rear end of vehicle 2 as it encounters the obstacle represented by 4×4 80. In some cases, where the speed of the vehicle and the conditions allow, the suspension may even be actively compressed prior to initiation of a downward thrust from active suspension component 61, allowing for a full travel of the active suspension component 61, and therefore greater vertical elevation of the front end of vehicle 2. All of these vertical maneuvers described in FIGS. 12-14 assume there are not better, or less disruptive maneuvers relying solely on steering and/or braking to avoid or contain the damage from road hazards, and would typically be used as a secondary option in the event a simple lane change would not be a viable solution. Avoiding damage from road hazards can be key to avoiding damage to the chassis and undercarriage of the vehicle 2, and to avoiding accidents caused by a loss of control of the vehicle 2 such as might be expected from a blown out tire, shattered suspension, or loss of steering.

Figure 15:
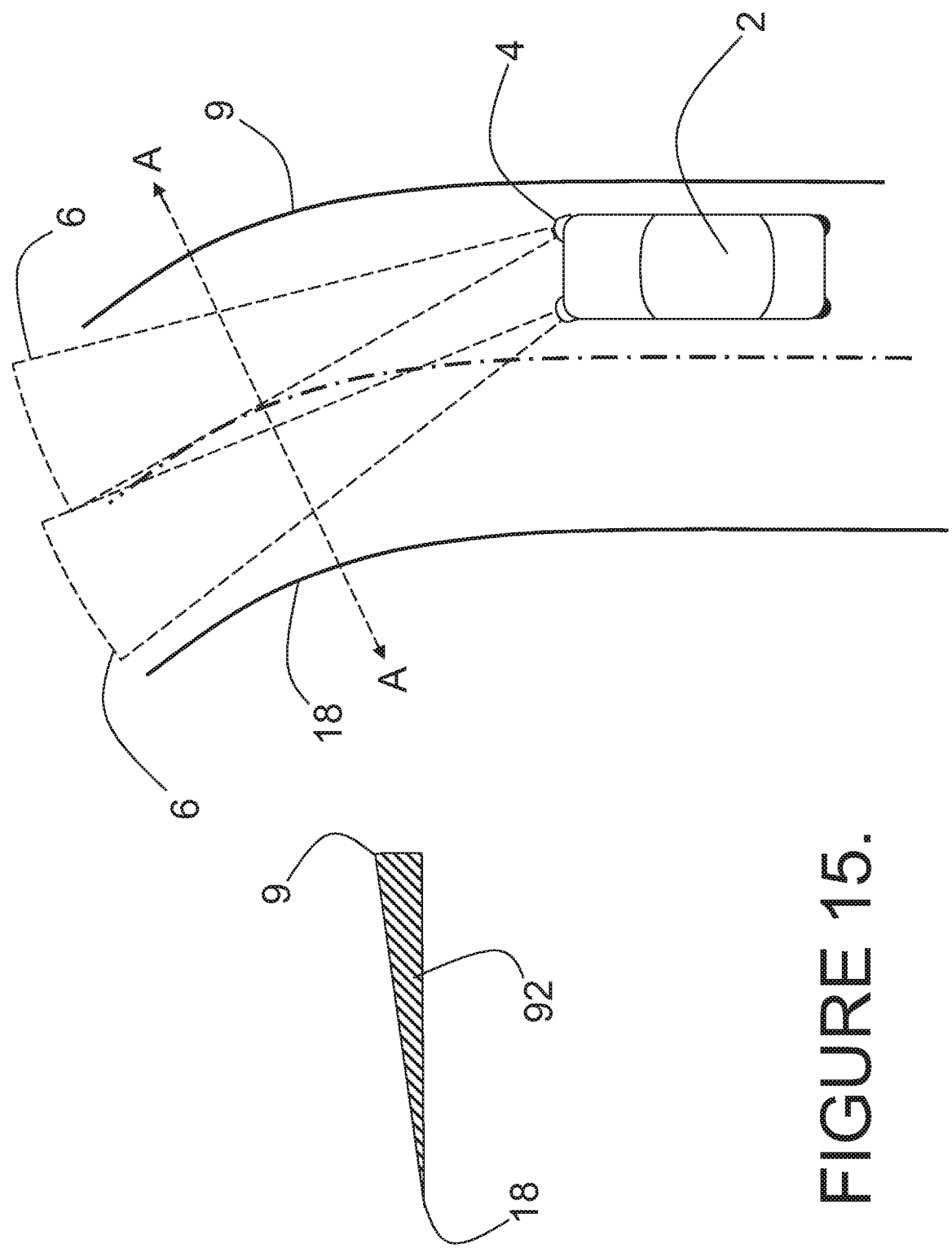
FIG. 15 is a diagram showing a third scenario in which vehicle stability and traction may be enhanced by the active adaption capability of the motor vehicle suspension.

FIG. 15 shows another scenario requiring a slightly different type of suspension adjustment. Entering a banked curve (9, 18) at high speed, vehicle 2 needs to adjust the right side (outside of the curve 9) suspension to be stiffer, i.e., a higher spring rate, and may need to also lower the driver (left) side of the car. These actions may prevent the car from diving lower into the outside of the curve 9, and thus keep the weight distribution on the four wheels evenly divided. This can be completed autonomously by the vehicle 2 using the present active suspension components 61 attached to each wheel. On the right side of vehicle 2, a reduction in air volume may effect an increase in spring rate in a manner similar to the reaction of the Citroen® suspension system. If the active suspension component 61 is a solenoid, additional inductance may give a higher spring rate. Additional inductance may be provided for by electrically switching in coils which have been pre-wound but not connected electrically. However, the preferred method is to use a dynamic electrical controller which can give a stiffer ride by reacting more forcefully to each deflection of the wheel 36 and control arms 46, 56 by applying increasing amounts of current to the solenoid in opposition to the natural movement of the wheel 36. An electrical impulse, or a step in gas pressure, or a change in the pressure of a hydraulic fluid may be used to lower the left side of the vehicle 2 relative to the right side in a left hand turn. At high speed, or when the curve is banked, the calculation of the amount of lowering may be adjusted by an onboard processor. The slope of the curve 92 is shown in the cross section of dashed line AA, and the slope, or bank has been fully mapped out by the radiation pattern 6 of the long range ladar sensors embedded in each of the steerable headlights 4. Unlike the example of the Citroen® suspension, which adapts the vehicle suspension reactively to reduce roll, the ladar enabled suspension modifying capability of the present invention allows the suspension to be adjusted proactively, in advance of the need, because of the 3D roadway sensing and modelling capabilities.

Figure 16:
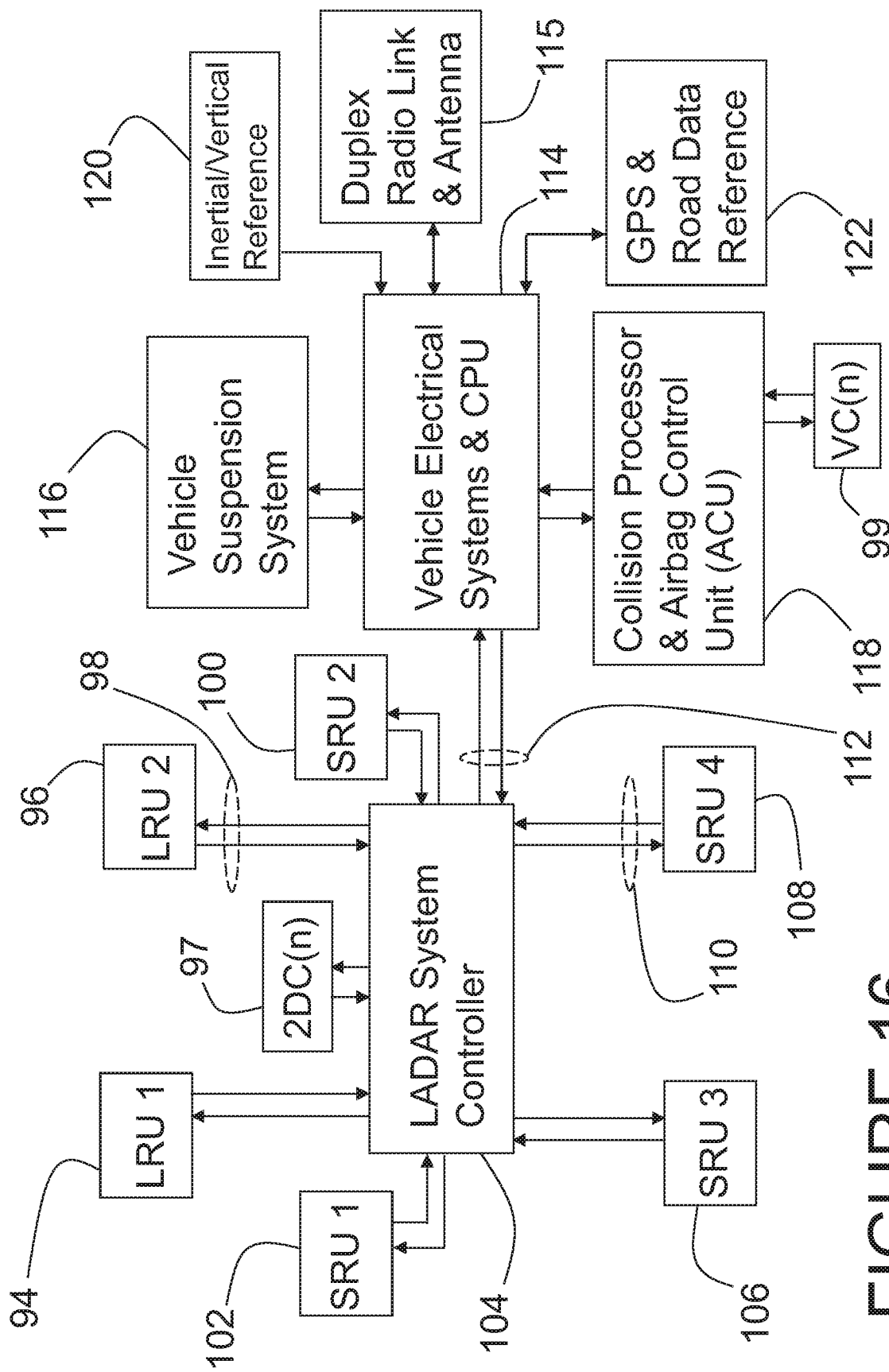
FIG. 16 is a block diagram showing the configuration of the ladar system, the individual ladar sensors, the host vehicle electrical and optical systems, and the several subsystems of the host vehicle supporting the impact mitigation system.

FIG. 16 is a block diagram of a preferred embodiment of the ladar enabled impact mitigation system. A ladar system controller 104 communicates with all 6 of the ladar sensors mounted on the vehicle. In a typical installation, two long range units, LRU 1 94 and LRU 2 96 connect to ladar system controller 104 through a set of bidirectional electrical connections 98. The electrical connections 98 may also have an optical waveguide and optical transmitters and receivers to transfer data, control, and status signals bidirectionally between long range ladar sensors 94 and 96 to ladar system controller 104. Ladar system controller 104 also communicates with the 4 short range units, SRU 1 102, SRU 2 100, SRU3 106, and SRU4 108, each through a set of bidirectional electrical connections 110. The electrical connections 110 may also have an optical waveguide and optical transmitters and receivers to transfer data, control, and status signals bidirectionally between short range ladar sensors 102, 100, 106, and 108, to ladar system controller 104. Each of the ladar sensor's ladars may include data processors to reduce the processing load on the central processor; for example, developing the point cloud and isolating/segmenting objects in the field of view and object speed from the point cloud. A number (n) of conventional 2D still or video cameras 97 also connect to ladar system controller 104, and are designed to overlap the fields of view of the ladar sensors installed on the vehicle 2. Bidirectional electrical connections 112 serve to transfer 3D data maps, status, and control signals between ladar system controller 104 and the vehicle electrical systems and central processing unit (CPU) 114. At the core of the vehicle, an electronic brain may control all functioning of the vehicle 2, and typically controls all other subsystems and co-processors. The electronic brain, or central processing unit (CPU 114) is here lumped together with the basic electrical systems of the vehicle, including battery, headlights, wiring harness, etc. The vehicle suspension system 116 receives control commands and returns status through bidirectional electrical connections, and is capable of modifying the ride height, spring rate, and damping rate of each of the four wheels independently. An inertial reference 120 also has a vertical reference, or gravity sensor as an input to the CPU 114. A global positioning reference 122 may also be connected to the vehicle CPU 114. The GPS reference 122 may also have a database of all available roads and conditions in the area which may be updated periodically through a wireless link. A duplex radio link 115 may also be connected to CPU 114, and communicate with other vehicles 8 in close range and which may be involved in a future impact, and may also receive road data, weather conditions, and other information important to the operations of the vehicle 2 from a central road conditions database. The vehicle 2 may also provide updates to the central road conditions database via radio uplink 115, allowing the central road conditions database to be augmented by any and all vehicles 2 which are equipped with ladar sensors and a radio link 115. A collision processor and airbag control unit 118 connects bidirectionally to CPU 114 as well, receiving inputs from a number of accelerometers, brake sensors, wheel rotational sensors, ladar sensors, etc. and makes decisions on the timing and deployment of both internal and external airbags 22. ACU 118 also controls the venting of external airbags 22 through bidirectional electrical connections to a number of vent controls 99 situated in the various external airbag units on the vehicle 2.

Figure 17:
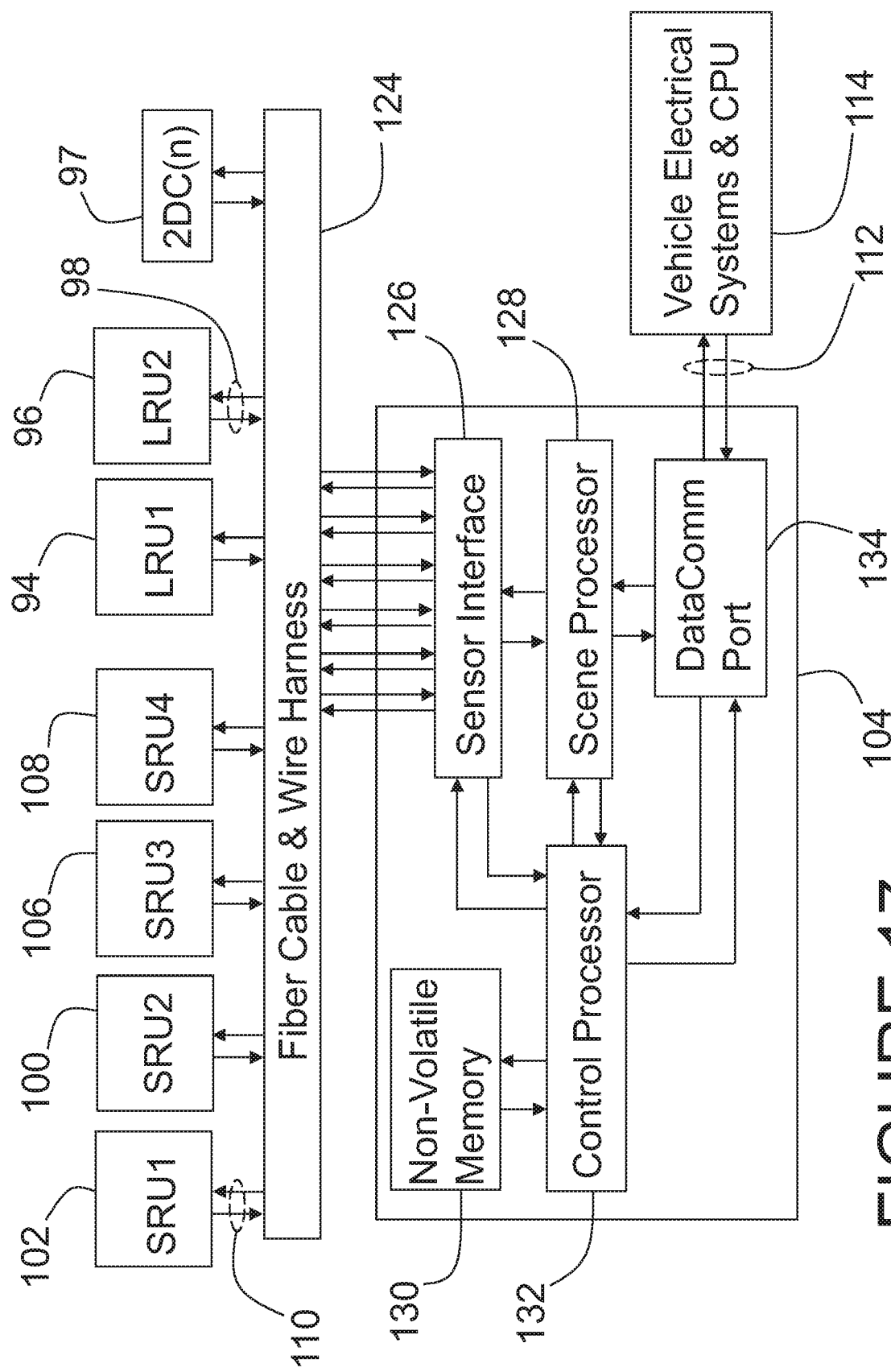
FIG. 17 is a block diagram showing additional details of the ladar system controller of FIG. 16, and the interconnection of the ladar system controller to the several ladar sensors installed on the vehicle.

FIG. 17. shows additional details of the ladar system controller 104 and interconnections to the suite of ladar sensors. The ladar system controller 104 comprises a sensor interface 126, which transmits commands to the short range ladar sensors SRU1-4 (100, 102, 106, and 108), and to the long range ladar sensors LRU1 94, and LRU2 96. A fiber cable and wire harness 124 provides the physical media for the transfer of the commands from the sensor interface 126 to the various ladar sensors. 3D data and status signals are returned from the various ladar sensors to sensor interface 126 through fiber cable and wire harness 124. Likewise, command signals are sent to a number (n) of 2D cameras 97, and status and image data are returned therefrom, via wire harness 124 to ladar system controller 104. Each long range sensor unit (94, 96) connects through a set of bidirectional connections 98 which logically include the transmitters and receivers within each long range sensor unit (94, 96), the physical media of fiber cable and wire harness 124, and the transmitters and receivers of sensor interface 126. Each short range sensor unit (100,102,106,108) connects through a set of bidirectional connections 110 which logically include the transmitters and receivers within each short range sensor unit (100,102,106,108), the physical media of fiber cable and wire harness 124, and the transmitters and receivers of sensor interface 126. Sensor interface 126 receives digital logic levels from scene processor 128 and control processor 132 and conditions these signals for transmission over fiber cable and wire harness 124 to the various ladar sensors installed on the vehicle 2. Sensor interface 126 may provide amplification, level adjustment, digital-to-analog conversion, and electrical-to-optical signal conversion for outbound signals from control processor 132 and scene processor 128 intended for one or more of the various ladar sensors or 2D cameras installed on the vehicle 2. Conversely, for inbound signals, sensor interface 126 may provide amplification, level shifting, analog-to-digital conversion, and optical-to-electrical conversion for 3D or 2D data and status signals sent from any one of the various ladar sensors or 2D cameras installed on the vehicle 2 and then provides these received and/or converted signals to control processor 132 and scene processor 128 as digital signals. Scene processor 128 combines the 3D frames received from each of the operational ladar sensors into a composite 3D map of the entire space directly in front of and surrounding the vehicle 2 and may also merge the 3D map with 2D image data received from a number (n) of 2D still or video cameras 97 to provide enhanced resolution or object identification. Complete 3D maps of the area surrounding the vehicle 2 are best enabled when the auxiliary, short range sensors are installed. In a preferred embodiment, the six ladar sensors comprised of 2 long range sensors and 4 short range sensors provide a full 360° field of view, and a 3D map may be synthesized by scene processor 128 for the entire space surrounding and in front of, vehicle 2. Overlapping fields of view between long range sensors may allow scene processor 128 to eliminate some shadows in the far field pattern, or to gain additional shape data which may allow positive identification of an object or obstacle in the path of the vehicle 2. Overlapping fields of view between short range and long range sensors give scene processor 128 additional shape information on any feature or object in the combined field of view, as well as a reduction of shadows, owing to the wider angles swept out by the short range sensors. Control processor 132 receives status data from the ladar sensors indicating laser temperature, transmitted laser pulse power and pulse shape, receiver temperature, background light levels, etc. and makes decisions about adjustments of global input parameters to the various ladar sensors being controlled. Global settings for detector bias, trigger sensitivity, trigger mode or SULAR mode, filter bandwidth, etc. may be sent from control processor 132 to a given ladar sensor which may override the local settings originally set or adjusted by a local control processor residing within a particular ladar sensor. A non-volatile memory 130 provides a storage location for the programs which run on control processor 132 and scene processor 128, and may be used to store status data and other data useful at start-up of the system. A data communications port 134 typically comprises an Ethernet port or Gigabit Ethernet port, but may be a USB, IEEE1394, Infiniband, or other general purpose data port, and is connected so as to provide bidirectional communications between the control processor 132 or the scene processor 128 and the vehicle electrical systems and central processors 114 through connections 112. Data communications port 134 may also be a special purpose communications port specific to a vehicle manufacturer.

Figure 18:
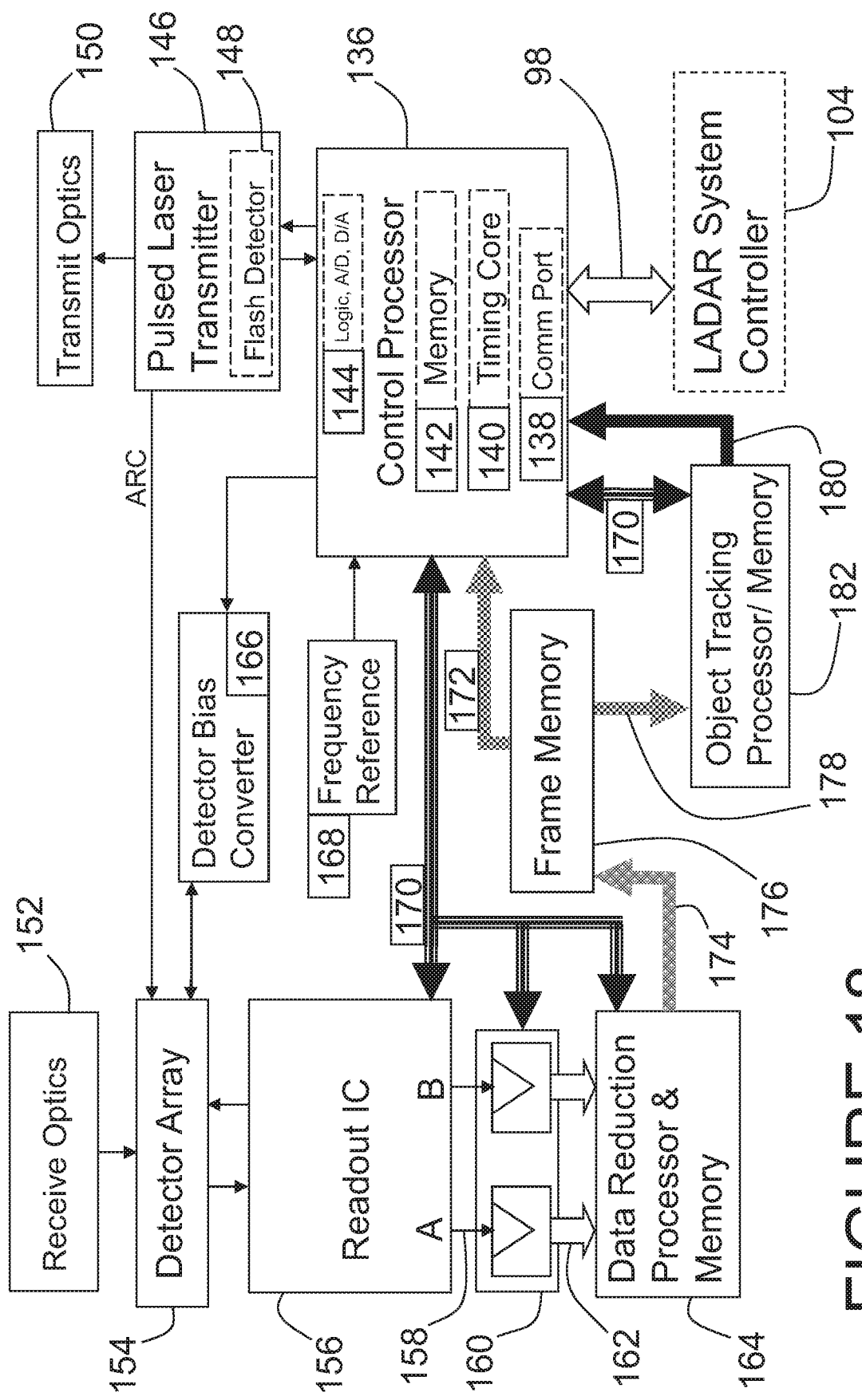
FIG. 18 is a block diagram showing the configuration and components of the individual ladar sensors of FIGS. 16 & 17.

FIG. 18. is a block diagram a ladar sensor which describes both long range ladar sensors 94 and short range sensors 100 typical of the preferred embodiment. Adaptations of the pulsed laser transmitter 146, transmit optics 150, receive optics 152, and in some cases, programmable changes to the sampling circuitry of readout integrated circuit 156 may be effected to provide range enhancement, wider or narrower field of view, and reduced size and cost. The first embodiment provides a 128×128 detector array 154 of light detecting elements situated on a single insulating sapphire substrate which is stacked atop a readout integrated circuit 156 using a hybrid assembly method. In other embodiments of the design, M×N focal plane arrays of light detecting elements with M and N having values from 2 to 1024 and greater are anticipated. The functional elements depicted in FIG. 18 may first be described with respect to the elements of a typical long range ladar sensor 94. A control processor 136 controls the functions of the major components of the ladar sensor 94. Control processor 136 connects to pulsed laser transmitter 146 through bidirectional electrical connections (with logic, analog to digital (A/D) and digital to analog (D/A) converters 144) which transfer commands from system controller 136 to pulsed laser transmitter 146 and return monitoring signals from pulsed laser transmitter 146 to the system controller 136. A light sensitive diode detector (Flash Detector) 148 is placed at the back facet of the laser so as to intercept a portion of the laser light pulse produced by the pulsed laser transmitter 146. An optical sample of the outbound laser pulse taken from the front facet of pulsed laser transmitter 146 is routed to a corner of the detector array 154 as an automatic range correction (ARC) signal, typically over a fiber optic cable. The pulsed laser transmitter 146 may be a solid-state laser, monoblock laser, semiconductor laser, fiber laser, or an array of semiconductor lasers. It may also employ more than one individual laser to increase the data rate. In a preferred embodiment, pulsed laser transmitter 146 is an array of vertical cavity surface emitting lasers (VCSELs). In an alternative embodiment, pulsed laser transmitter 146 is a disc shaped solid state laser of erbium doped phosphate glass pumped by 976 nanometer semiconductor laser light.

In operation, the control processor 136 initiates a laser illuminating pulse by sending a logic command or modulation signal to pulsed laser transmitter 146, which responds by transmitting an intense pulse of laser light through transmit optics 150. In the case of a solid state laser based on erbium glass, neodymium-YAG, or other solid-state gain medium, a simple bi-level logic command may start the pump laser diodes emitting into the gain medium for a period of time which will eventually result in a single flash of the pulsed laser transmitter 146. In the case of a semiconductor laser which is electronically pumped, and may be modulated instantaneously by modulation of the current signal injected into the laser diode, a modulation signal of a more general nature is possible, and may be used with major beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in on-chip memory 142 as a lookup table of digital memory words representative of analog values, which lookup table is read out in sequence by control processor 136 and converted to analog values by an onboard digital-to-analog (D/A) converter 144, and passed to the pulsed laser transmitter 146 driver circuit. The combination of a lookup table stored in memory 142 and a D/A converter, along with the necessary logic circuits, clocks, and timers 140 resident on control processor 136, together comprise an arbitrary waveform generator (AWG) circuit block. The AWG circuit block may alternatively be embedded within a laser driver as a part of pulsed laser transmitter 146. Transmit optics 150 diffuses the high intensity spot produced by pulsed laser transmitter 146 substantially uniformly over the desired field of view to be imaged by the long range ladar sensor 94. An optical sample of the transmitted laser pulse (termed an ARC signal) is also sent to the detector array 154 via optical fiber. A few pixels in a corner of detector array 154 are illuminated with the ARC (Automatic Range Correction) signal, which establishes a zero time reference for the timing circuits in the readout integrated circuit (ROIC) 156. Each unit cell of the readout integrated circuit 156 has an associated timing circuit which is started counting by an electrical pulse derived from the ARC signal. Alternatively, the flash detector 148 signal may be used as a zero reference in a second timing mode. Though the ARC signal neatly removes some of the variable delays associated with transit time through the detector array 154, additional cost and complexity is the result. Given digital representations of the image frames, the same task may be handled in software/firmware by a capable embedded processor such as data reduction processor 164. When some portion of the transmitted laser pulse is reflected from a feature in the scene in the field of view of the long range ladar sensor 94, it may be incident upon receive optics 152, typically comprising the lens of a headlight assembly, a parabolic reflecting lens within the headlight assembly, and an array of microlenses atop detector array 154. Alternative embodiments use enhanced detectors which may not require the use of microlenses. Pulsed laser light reflected from a feature in the scene in the field of view of receive optics 152 is collected and focused onto an individual detector element of the detector array 154. This reflected laser light optical signal is then detected by the affected detector element and converted into an electrical current pulse which is then amplified by an associated unit cell electrical circuit of the readout integrated circuit 156, and the time of flight measured. Thus, the range to each reflective feature in the scene in the field of view is measurable by the long range ladar sensor 94. The detector array 154 and readout integrated circuit 156 may be an M×N or N×N sized array. Transmit optics 150 consisting of a spherical lens, cylindrical lens, holographic diffuser, diffractive grating array, or microlens array, condition the output beam of the pulsed laser transmitter 146 into a proper conical, elliptical, or rectangular shaped beam for illuminating a central section of a scene or objects in the path of vehicle 2, as illustrated in FIG. 1.

Figure 20:
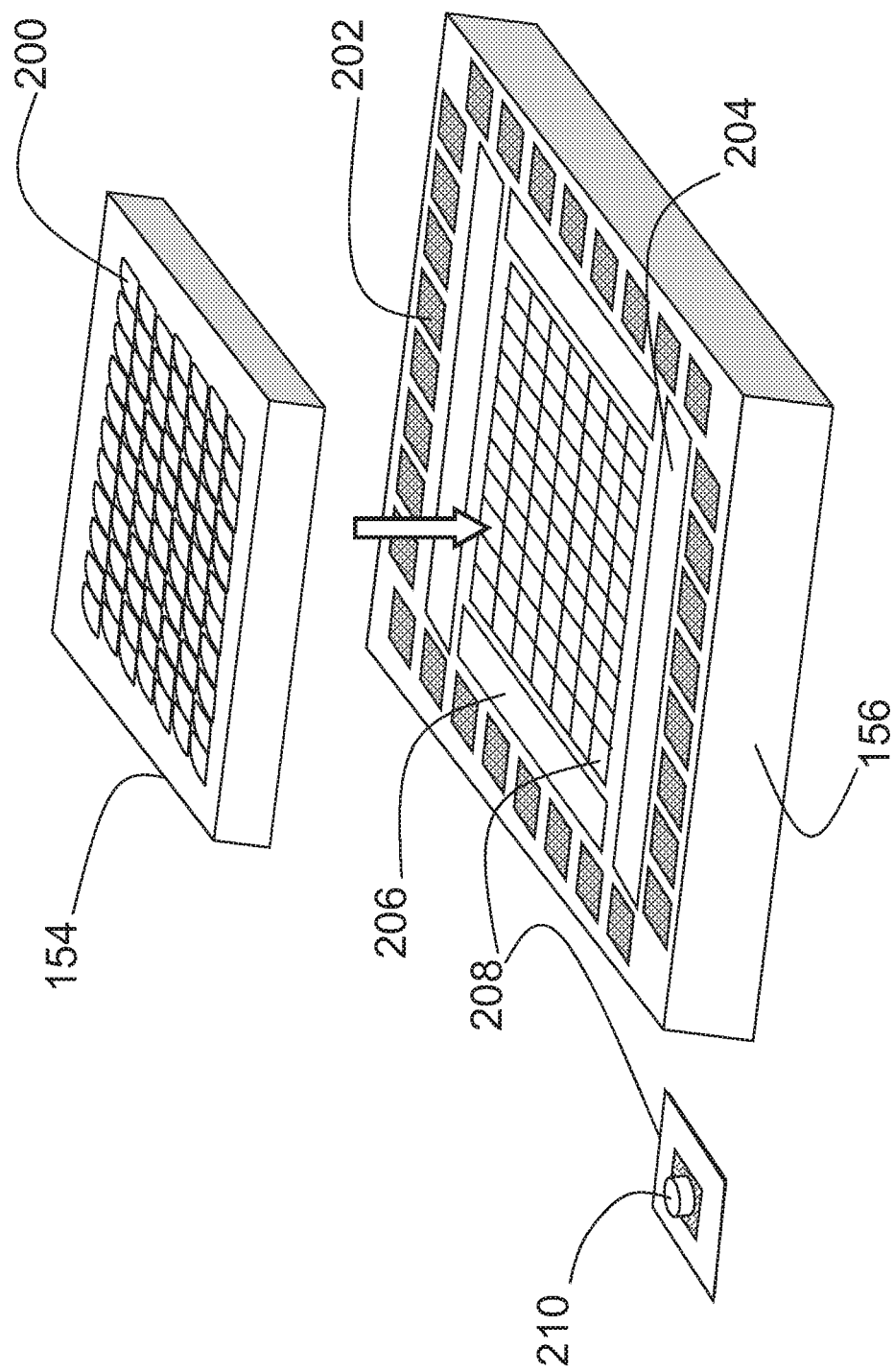
FIG. 20 is an isometric view of the hybrid assembly of the detector array and readout integrated circuit described in FIGS. 18 and 19.

Continuing with FIG. 18, receive optics 152 may be a convex lens, spherical lens, cylindrical lens or diffractive grating array. Receive optics 152 collect the light reflected from the scene and focus the collected light on the detector array 154. In a preferred embodiment, detector array 154 is formed in a thin film of gallium arsenide deposited epitaxially atop an indium phosphide semiconducting substrate. Typically, detector array 154 would have a set of cathode contacts exposed to the light and a set of anode contacts electrically connected to the supporting readout integrated circuit 156 through a number of indium bumps deposited on the detector array 154. The cathode contacts of the individual detectors of detector array 154 would then be connected to a high voltage detector bias grid on the illuminated side of the array. Each anode contact of the detector elements of detector array 154 is thus independently connected to an input of a unit cell electronic circuit of readout integrated circuit 156. This traditional hybrid assembly of detector array 154 and readout integrated circuit 156 may still be used, but new technology may reduce inter-element coupling, or crosstalk, and reduce leakage (dark) current and improve efficiency of the individual detector elements of detector array 154. In a preferred embodiment, the elements of detector array 154 may be formed atop a substantially monocrystalline sapphire wafer. Sapphire substrates with a thin layer of substantially monocrystalline silicon are available in the marketplace (SOS wafers), and are well known for their superior performance characteristics. A detector array 154 of APD, PIN, or PN junction detectors may be formed of a sequence of layers of p-type and n-type silicon via epitaxial regrowth on the SOS wafers. Boron and aluminum may be used as dopants for any of the p-type silicon epitaxial layers. Phosphorus, arsenic, and antimony may be used as dopants for any of the n-type silicon epitaxial layers. Sapphire substrates with a thin layer of substantially monocrystalline gallium nitride are also available in the marketplace (GNOS wafers), and are well known as substrates well suited to the fabrication of high brightness blue LEDs. A detector array 154 of APD, PIN, or PN junction detectors may be formed of a sequence of layers of p-type and n-type gallium nitride (GaN) or indium gallium nitride (InGaN) via epitaxial regrowth on the GNOS wafers. Silicon and germanium may be used as dopants for any of the n-type GaN layers. In some cases, magnesium may be used as a dopant for of the p-type layers in GaN. In a further development, detector array 154 may be fabricated monolithically directly atop readout IC 156. Detector array 154 may also be formed in a more conventional manner from compounds of indium gallium arsenide, indium aluminum arsenide, silicon carbide, diamond, mercury cadmium telluride, zinc selenide, or other well known semiconductor detector system. Readout integrated circuit 156 comprises a rectangular array of unit cell electrical circuits, each unit cell with the capability of amplifying a low level photocurrent received from an optoelectronic detector element of detector array 154, sampling the amplifier output, and detecting the presence of an electrical pulse in the unit cell amplifier output associated with a light pulse reflected from the scene and intercepted by the detector element of detector array 154 connected to the unit cell electrical input. The detector array 154 may be an array of avalanche photodiodes, capable of photoelectron amplification, and modulated by an incident light signal at the design wavelength. The detector array 154 elements may also be a P-intrinsic-N design or N-intrinsic-P design with the dominant carrier being holes or electrons respectively; in which case the corresponding ROIC 156 would have the polarity of the bias voltages and amplifier inputs adjusted accordingly. The hybrid assembly of detector array 154 and readout integrated circuit 156 of the preferred embodiment is shown in FIG. 20, and the assembly is then mounted to a supporting circuit assembly, typically on a FR-4 substrate or ceramic substrate (not shown). The circuit assembly provides support circuitry which supplies conditioned power, a reference clock signal, calibration constants, and selection inputs for the readout column and row, among other support functions, while receiving and registering range and intensity outputs from the readout integrated circuit 156 for the individual elements of the detector array 154, and shown here in FIG. 18. Many of these support functions may be implemented in RISC processors which reside on the same circuit assembly. A detector bias converter circuit 166 applies a time varying detector bias to the detector array 154 which provides optimum detector bias levels to reduce the hazards of saturation in the near field of view of detector array 154, while maximizing the potential for detection of distant objects in the field of view of detector array 154. The contour of the time varying detector bias supplied by detector bias converter 166 is formulated by control processor 136 based on inputs from the data reduction processor 164, indicating the reflectivity and distance of objects or points in the scene in the field of view of the detector array 154. Control processor 136 also provides several clock and timing signals from a timing core 140 to readout integrated circuit 156, data reduction processor 164, analog-to-digital converters 160, object tracking processor 182, and their associated memories. Control processor 136 relies on a temperature stabilized frequency reference 168 to generate a variety of clocks and timing signals. Temperature stabilized frequency reference 168 may be a temperature compensated crystal oscillator (TCXO), dielectric resonator oscillator (DRO), or surface acoustic wave device (SAW). Timing core 140 resident on control processor 136 may include a high frequency tunable oscillator, programmable prescaler dividers, phase comparators, and error amplifiers.

Continuing with FIG. 18, control processor 136, data reduction processor 164, and object tracking processor 182 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 176 serves to hold a number of frames, each frame being the image resulting from a single laser pulse. Both data reduction processor 164 and object tracking processor 182 may perform 3D image processing, to reduce the load on a central processing unit normally associated with ladar system controller 104. There are two modes of data collection, the first being SULAR, or a progressive scan in depth. Each laser pulse typically results in 20 "slices" of data, similar to a CAT scan, and each "slice" may be stored as a single page in the common frame memory 176. With each pixel sampling at a 2 nanosecond interval, the "slices" are each a layer of the image space at roughly 1 foot differences in depth. The 20 slices represent a frame of data, and the sampling for a succeeding laser pulse may be started at 20 feet further in depth, so that the entire image space up to 1000 feet in range or depth, may be swept out in a succession of 50 laser illuminating pulses, each laser pulse response consisting of 20 "slices" of data held in a single frame entry. In some cases, the frame memory may be large enough to hold all 50 frames of data. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs 158 of readout integrated circuit 156, which represent the interleaved row or column values of the 128×128 pixel of the present design. The "A" and "B" outputs are analog outputs, and the analog samples presented there are converted to digital values by the dual channel analog-to-digital (A/D) converter 160. Interleaving the outputs means one of the outputs ("A") reads out the odd numbered lines of the readout IC 156, and the other output ("B") reads out the even numbered lines of the readout IC 156. The digital outputs 162 of the A/D converters 160 connect to the inputs of the data reduction processor 164. A/D converters 160 may also be integrated into readout integrated circuit 156. The digital outputs 162 are typically 10 or 12 bit digital representations of the uncorrected analog samples measured at each pixel of the readout IC 156, but other representations with greater or fewer bits may be used, depending on the application. The rate of the digital outputs 162 depends upon the frame rate and number of pixels in the array. In TRIGGER mode, a great deal of data reduction has already transpired, since the entire range or depth space may be swept out in the timeframe of a single laser pulse, and the data reduction processor 164 would only operate on the 20 analog samples stored in each unit cell in order to refine the nominal range measurement received from each pixel (unit cell) of the array. The data reduction processor 164 refines the nominal range measurements received from each pixel by curve fitting of the analog samples to the shape of the outgoing laser illuminating pulse, which is preserved by the reference ARC pulse signal. In TRIGGER acquisition mode, the frame memory 176 only needs to hold a "point cloud" image for each illuminating laser pulse. The term "point cloud" refers to an image created by the range and intensity of the reflected light pulse as detected by each pixel of the 128×128 array of the present design. In TRIGGER mode, the data reduction processor serves mostly to refine the range and intensity (R&I) measurements made by each pixel prior to passing the R&I data to the frame memory 176 over data bus 174, and no "slice" data or analog samples are retained in memory independently of the R&I "point cloud" data in this acquisition mode. Frame memory 176 provides individual or multiple frames, or full point cloud images, to control processor 136 over data bus 172, and to an optional object tracking processor 182 over data bus 178 as required.

As shown in FIG. 18, data reduction processor 164 and control processor 136 may be of the same type, a reduced instruction set (RISC) digital processor with hardware encoded integer and floating point arithmetic units. Object tracking processor 182 may also be of the same type as RISC processors 164 and 136, but may in some cases be a processor with greater capability, suitable for highly complex graphical processing. Object tracking processor 182 may have in addition to hardware encoded integer and floating point arithmetic units, a number of hardware encoded matrix arithmetic functions, including but not limited to; matrix determinant, matrix multiplication, and matrix inversion. In operation, the control processor 136 controls readout integrated circuit 156, A/D converters 160, data reduction processor 164 and object tracking processor 182 through a bidirectional control bus 170 which allows for the master, control processor 136 to pass commands on a priority basis to the dependent peripheral functions; readout IC 156, A/D converters 160, data reduction processor 164, and object tracking processor 182. Bidirectional control bus 170 also serves to return status and process parameter data to control processor 136 from readout IC 156, A/D converters 160, data reduction processor 164, and object tracking processor 182. Data reduction processor 164 refines the nominal range data and adjusts each pixel intensity data developed from the digitized analog samples received from A/D converters 160, and outputs a full image frame via unidirectional data bus 174 to frame memory 176, which is a dual port memory having the capacity of holding several frames to several thousands of frames, depending on the application. Object tracking processor 182 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 182 are transmitted through unidirectional data bus 180 to a communications port 138, which may be resident on control processor 136. All slice data, range and intensity data, control, and communications then pass between communications port 138 and a centralized ladar system controller 104, (FIG. 17) through bidirectional connections 98. Power and ground connections (not shown) may be supplied through an electromechanical interface. Bidirectional connections 98 may be electrical or optical transmission lines, and the electromechanical interface may be a DB-25 electrical connector, or a hybrid optical and electrical connector, or a special automotive connector configured to carry signals bidirectionally for the long range ladar sensor 94 as well as electrical connections for a headlamp assembly which may have the long range ladar sensor 94 embedded therein. Bidirectional connections 98 may be high speed serial connections such as Ethernet, USB or Fibre Channel, or may also be parallel high speed connections such as Infiniband, etc., or may be a combination of high speed serial and parallel connections, without limitation to those listed here. Bidirectional connections 98 also serve to upload information to control processor 136, including program updates for data reduction processor 164, object tracking processor 182, and global position reference data, as well as application specific control parameters for the remainder of the long range ladar sensor 94 functional blocks. Inertial and vertical reference 120 also provides data to the long range ladar sensor 94 from the host vehicle 2 through the vehicle electrical systems and CPU 114, bidirectional electrical connections 112, and the ladar system controller 104 as needed (see FIG. 16). Likewise, any other data from the host vehicle 2 which may be useful to the long range ladar sensor 94 may be provided in the same manner as the inertial and vertical reference data. Inertial and vertical reference data may be utilized in addition to external position references by control processor 136, which may pass position and inertial reference data to data reduction processor 164 for adjustment of range and intensity data, and to object tracking processor 182 for utilization in multi-frame data synthesis processes. The vertical reference commonly provides for measurement of pitch and roll, and is adapted to readout an elevation angle, and a twist angle (analogous to roll) with respect to a horizontal plane surface normal to the force of gravity. The long range ladar sensor 94 typically employs a q-switched solid state laser, which produces a single output pulse with a Gaussian profile if properly controlled. The pulse shape of a solid state laser of this type is not easily modulated, and therefore must be dealt with "as is" by the long range ladar sensor 94 receiver section. The operations of a short range ladar sensor 100 of the type which are typically embedded in an auxiliary lamp assembly such as a taillight, turn signal, or parking light are the same as the operations of the long range ladar sensor 94 described above with some exceptions. The short range ladar sensor 100 of the preferred embodiment employs a semiconductor laser which may be modulated in several ways, as opposed to the solid state laser typically employed in a long range ladar sensor 94 of the preferred embodiment. The long range ladar sensor 94 and short range ladar sensor 100 may differ only in the type of laser employed and the type of laser modulation. The transmit optics 150 and receive optics 152 may also differ, owing to the different fields of view for a long range ladar sensor 94 and a short range ladar sensor 100. Differences in the transmitted laser pulse modulation between the long range ladar sensor 94 and short range ladar sensor 100 may be accommodated by the flexible nature of the readout IC 156 sampling modes, and the data reduction processor 164 programmability. The host vehicle 2 may have a number of connector receptacles generally available for receiving mating connector plugs from USB, Ethernet, RJ-45, or other interface connection, and which may alternatively be used to attach long range ladar sensors 94 or short range ladar sensors 100 of the type described herein.

In the preferred embodiments described herein, a number of digital processors have been identified, some associated with the host vehicle (2), some associated with the ladar subsystem (3), and some associated with the individual ladar sensors (3). The partitioning and the naming of these various digital processors has been made based on engineering judgment, but other partitioning and naming conventions may be used without changing the scope or intent, or affecting the utility of the invention. Those processors associated with the vehicle; the vehicle CPU 118, and the collision processor and airbag control unit 114, may be combined in some future embodiments. A combined vehicle CPU 118 and collision processor and airbag control unit 114 may also incorporate ladar system controller 104, which is normally associated with the ladar subsystem. The ladar system controller 104 (including scene processor 128 and control processor 132) may in some alternative embodiments be eliminated as a circuit, and only the functions normally performed by ladar system controller 104, as described herein as contemplated for use with the present invention, would then be assumed by a more powerful vehicle CPU 118. Likewise, the object tracking processor 182 of the individual ladar sensor could be absorbed into the vehicle CPU 114, as could other ladar sensor processors such as the data reduction processor 164 and control processor 136. This would follow a trend toward greater centralization of the computing power in the vehicle. A trend towards decentralization may also take place in reverse, some alternative embodiments having ever more of the processing power pushed down into the ladar sensor subsystem. In other alternative embodiments, perhaps in a robotic vehicle where only a single ladar sensor might be installed, substantially all of the processing power could be incorporated in the individual ladar sensor itself. The term digital processor may be used generically to describe either digital controllers or digital computers, as many controllers may also perform pure mathematical computations, or perform data reduction, and since many digital computers may also perform control operations. Whether a digital processor is termed a controller or a computer is a descriptive distinction, and not meant to limit the application or function of either device.

Continuing with FIG. 18, the use of a semiconducting laser in a preferred embodiment for a short range ladar sensor 100 allows for tailoring of the drive current to a VCSEL laser, one example of a semiconductor laser, or any diode laser, so as to produce a Gaussian optical pulse shape with only slight deviations. The VCSEL response time is in the sub-nanosecond regime, and the typical pulse width might be 5-100 nanoseconds at the half power points. In the diagram of FIG. 18, the VCSEL and laser driver would be part of the pulsed laser transmitter 146, and the desired pulse or waveshape is itself produced by a digital-to-analog converter 144 which has a typical conversion rate of 200-300 MHz, so any deviations in the output pulse shape from the Gaussian ideal may be compensated for in the lookup table in memory 142 associated with control processor 136, which serves as the digital reference for the drive current waveform supplied to the laser driver within pulsed laser transmitter 146 by the D/A converter. A Gaussian single pulse modulation scheme works well at short ranges, given the limited optical power available from a VCSEL laser. Extending the range of a VCSEL laser transmitter may be done using more sophisticated modulation schemes such as multi-pulse sequences, sinewave bursts, etc. The VCSEL laser and modulation schemes as described herein with reference to short range ladar sensor 100 may be used to replace the solid state laser in pulsed laser transmitter 146 of the long range ladar sensor 94 to reduce cost, size, power consumption, and/or enhance reliability.

Figure 19:
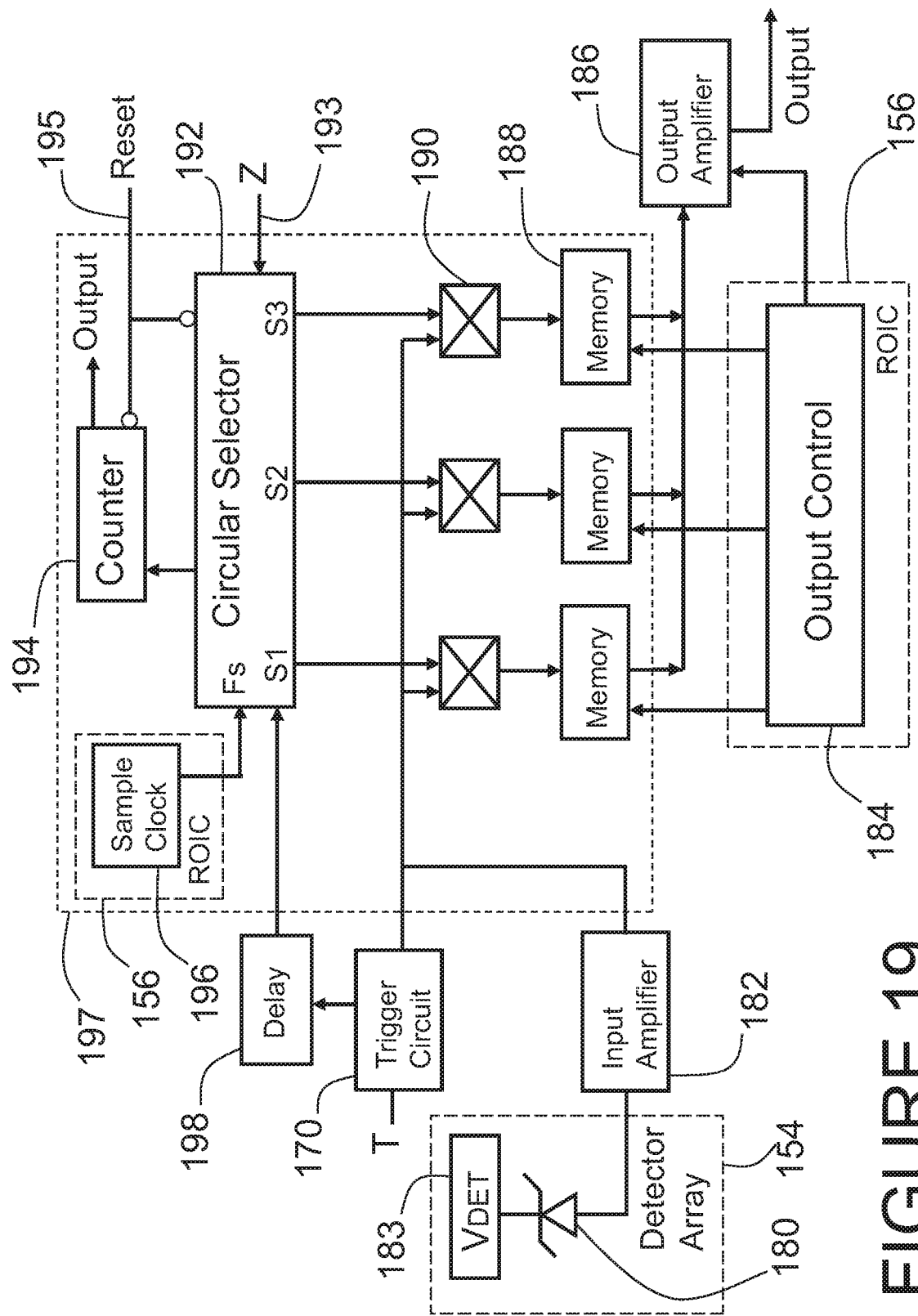
FIG. 19 is a schematic diagram showing the configuration and components of the unit cell electronics of the readout integrated circuit of FIG. 18.

The unit cell electronics depicted in FIG. 19 is well adapted to work with a Gaussian single pulse modulation scheme, and works advantageously with other modulation schemes as well, including sequences of flat-topped pulses, Gaussian, or otherwise shaped pulses. These pulses may be of varying width and spacing, in order to reduce range ambiguities, and may also be random pulse sequences, or in other cases, Barker coded pulse sequences. In the typical operation of a long range ladar sensor 94 having a solid state laser producing a single Gaussian output pulse, some portion of the pulsed laser light reflected from a surface in the field of view of the long range ladar sensor 94 is concentrated and focused by receive optics 152 and falls on an individual detector element 180 of detector array 154. The individual element 180 is typically an avalanche photodiode, but may be a PIN or NIP, or other structure. Each individual element 180 of detector array 154 is formed in a semiconducting film comprised of silicon, indium gallium arsenide phosphide, aluminum gallium arsenide, indium gallium nitride, or other semiconducting compound appropriate to the wavelength of operation. Each individual element 180 is biased with a voltage by a bias voltage distribution network VDET 183. The reflected light signal incident upon the individual detector element 180 is converted to an electronic signal, typically a photocurrent, and amplified by input amplifier 182, typically a transimpedance amplifier. The output of input amplifier 182 is distributed to a trigger circuit 170 as well as a number of analog sampling gates 190. The trigger circuit 170 is typically a threshold voltage comparator, set to trigger when a pulse is received which exceeds a predetermined magnitude, though other pulse detection schemes may be used. After a programmable delay through delay circuit 198, the circular selector 192 is frozen by the logic transition of trigger circuit 170 output. Prior to the detection of a received pulse by trigger circuit 170, the sample clock 196 causes the state of circular selector 192 to advance, enabling one of the sampling control outputs S1-S3, which in turn causes a sampling of the input amplifier 182 output by one of the sampling gates 190. The number of transitions of sample clock 196 are counted by counter 194, as the circular selector 192 outputs a logic transition to counter 194 for every cycle of the sampling clock after the release of the active low reset line 195. Circular selector 192 may cycle through outputs S1-S3 in order, or may have a different order, depending on the programming. A second circular selector 192, and sample clock 196 may operate in parallel, along with counter 194, analog sampling gates 190 and analog memory cells 188. The combination of sample clock 196, counter 194, circular selector 192, sampling gates 190, and memory cells 188 may be termed a unit cell sampling structure 197, indicated by the short dashed line border. Two, three, or more of these sampling structures may be operated in parallel on the output of input amplifier 182, with the advantages of such a structure to be described later in regards to range ambiguity. Shown in FIG. 19 are three sampling gates, and analog memory cells, but the number may be several hundred or more on some readout ICs 156. Once all of the analog sample data has been taken, a control command from the control processor 136 initiates a readout cycle by activating output control 184 and output amplifier 186 to readout the contents of the analog memory cells 188 in a predetermined order.

In a typical short range ladar sensor 100, and assuming a 1 cm² VCSEL array with a 5 kW/cm² power density, and depending upon the reflectivity of the objects in the field of view of short range ladar sensor 100, and the responsivity and excess noise of the detector array 154, the effective range of a Gaussian single pulse modulation scheme might be in the range of 10-20 meters, using a simple threshold detection technique. Without resorting to a large VCSEL array, which might be expensive and might require a large discharge capacitor to supply a large current pulse, more sophisticated modulation and detection techniques can be used to create additional processing gains, to effectively increase the signal-to-noise ratio, and thus extend the range of the short range ladar sensor 100 without requiring an increase in power. In a first modulation scheme, which produces a Gaussian single pulse modulation, a detection technique may be employed which uses the digitized analog samples from each unit cell electrical circuit, and processes these samples in a digital matched filter to find the centroid of the received pulse, resulting in significant processing gain. The processing gains resulting from this structure are proportional to the square root of the number of samples used in the filtering algorithm. For example, a unit cell electrical circuit with 256 analog memory cells 188 could yield a processing gain of 16 if all the available analog samples were used in a matched filter algorithm, assuming Gaussian single pulse modulation, and a normal noise distribution. The term "processing gain" is used here to describe the increase in effective signal-to-noise ratio (SNR) realized by performing the described operations on the voltage samples. Assuming the pulsed laser light is distributed uniformly over just the field of view of the receive optics 152, the effective range of the ladar also increases as the square root of the transmitted power (or SNR), and an increase in range to 40-80 meters could be the result. Single pulse Gaussian modulation may be characteristic of either a solid state laser or a semiconductor laser with a simple driver, and thus may be an attribute of either a long range ladar sensor 94 or a short range ladar sensor 100.

In a second modulation scheme, a VCSEL array modulated with a series of Barker encoded flat-topped or Gaussian pulses can be sampled by the unit cell electronics of FIG. 19 and analyzed by data reduction processor 164 for range and intensity estimates. In a third modulation scheme, a VCSEL array modulated with a pulsed sinewave allows for greater cumulative energy to be reflected from a feature in a scene in the field of view of either a short range ladar sensor 100 or a long range ladar sensor 94 without an increase in peak power. Each peak of a pulsed sinewave will have a separate reflection from an object or feature in the scene in the field of view of the ladar sensor (94, 100) and the unit cell electrical circuit of FIG. 19 allows the ladar sensor receiver to respond to the cumulative energy from many of these reflected pulses using a minimum of circuitry. The waveform in a preferred embodiment is a number of sinewave cycles, and the number could be quite large, depending on a number of factors. The receiver circuitry of the unit cell electronics shown in FIG. 19 is capable of sampling or of synchronously detecting the cumulative energy of the returned pulse peaks. Two sampling modes may be supported by the unit cell sampling structure shown in FIG. 19. When taking analog samples of single pulse or multi pulse sequences, wherein analog samples of an incoming waveform are being sequentially taken, the sampling impedance control 193 (Z) to the circular selector 192 would be set to a minimum value. The sampling frequency of sample clock 196 would also be selected to produce 10 or perhaps 20, analog samples during each pulse width. When the sampling impedance control 193 is set to a minimum, the sample controls S1, S2, S3 . . . turn on with full voltage during a sampling cycle. Since each sampling gate 190 is a field effect transistor, increasing the sample control voltage S1-S3 will increase the gate-source voltage on the sampling FET, thus lowering the impedance of the channel between source and drain, and setting the sampling gate impedance to a minimum. When the sampling gate 190 impedance is set to a minimum, the storage capacitor serving as analog memory cell 188 charges rapidly to the voltage present at the output of input amplifier 182. This mode can be termed "instantaneous voltage sampling" to distinguish the mode from a second sampling mode, which is selected when the sampling impedance control 193 is set to a higher, or even maximum value. When the sampling impedance control 193 is selected for high impedance, or maximum series resistance value, the outputs S1-S3 would be at or near minimum voltages when enabled, resulting in a lower gate-source voltage across each of the sampling gate FETs 190, and thus a higher sampling gate series resistance in the channel between source and drain of each sampling gate 190 FET. With the series resistance of the sampling gates 190 set to high or maximum value, the effect is to cause an R-C filter to develop, with the analog memory cell 188 storage capacitor performing as an integrating capacitor. This second sampling mode may be very useful when a sinusoidal modulation is applied to the pulsed laser transmitter 146 in the case where the laser is a semiconductor laser, typically a high efficiency VCSEL. By applying a sampling clock to the sampling gate 190 driven by S1, and which is the same frequency as the sinusoidal modulation, a sum frequency and a difference frequency will be in the sampled signal, and the analog memory cell 188 storage capacitor will filter out the sum frequency, and the difference frequency will be zero, leaving only a DC voltage component, which will be a trigonometric function of the phase difference. Over a number of cycles of the sinusoidal modulation from the output of input amplifier 182, this DC voltage will emerge as the sine or cosine of the phase difference. This phase difference is proportional to the range to a reflecting surface. To improve the processing gain, the second sampling gate driven by the S2 signal is driven by the same sampling clock frequency, but shifted by 90 degrees in phase, and the greater of the two DC voltages, or a ratio of the two voltages, may used to estimate phase, and thereby range. Typically, a ratio is preferred, as it removes the variation in amplitude of the incoming sinewave as an error term. This type of detection relies on "In-phase" and "Quadrature-phase" local references, and is often referred to as an "I&Q" detection scheme. Thus, the sampling gates 190 can be operated as instantaneous voltage samplers in a first sampling mode, or as frequency mixers in a second sampling mode, depending on the state of the sampling impedance control 193, and the frequency applied by sampling clock 196. In the first sampling mode, the shape of a pulse or sequence of pulses may be acquired, and in second sampling mode, a periodic waveform modulation such as a sinewave, may be demodulated through the frequency mixing effect and integration on a storage capacitor, resulting in a phase measurement and thereby range. In a third modulation case, two and perhaps three sinewaves of different frequencies are superimposed as a modulation signal on a semiconductor laser, and the received waveform output from input amplifier 182 is sampled by 2 or 3 unit cell sampling structures 197 arranged in parallel, and operating at the 2 or 3 different frequencies of the modulation signal. Each frequency is demodulated and the phase measured by the unit cell sampling structure tuned to the frequency of interest by feeding the appropriate sampling frequency from sample clock 196, typically a copy of the modulation frequency.

When measuring the phase of reflected laser energy with respect to a transmitted laser sinewave modulation, certain limits must be observed. If the ladar should have a maximum range capability of 150 meters in free space, the total round trip delay from transmit to receive would be around 1 microsecond. For the phase measurement to be meaningful, the frequency of transmission must therefore be less than 1 MHz to avoid spatial (distance) aliasing of targets at the 150 meter limit. In other words, the further the target, the lower the frequency of modulation must be for a single modulation frequency phase measurement to be meaningful. In a conventional sweep radar, the dwell time on the target is limited, so return signals beyond the maximum design range often do not appear as aliased, or "ghost" signals at a shorter apparent range. In the ladar of the instant invention, the typical mode is a staring mode, and there is no sweep of the illuminating beam or receiving antenna across the target space. Therefore, in the ladar sensor (94,100) of the present design, responses from targets beyond the designed maximum range could produce an aliased response (one in which the phase shift is greater than $2\pi$). A method for resolving these aliased, or "ghost" images is to illuminate the target in a second or third transmission with a slightly different frequency; for example 0.99 MHz versus the 1.0 MHz in a first gated sinewave illuminating pulse. If the target image remains at the same apparent range, it is likely a real target at a range less than the design maximum range limit. If the apparent range of the target shifts at the second illuminating frequency, it is likely the image is an aliased, or "ghost" image from a target at a distance beyond the design maximum range of the ladar sensor (94, 100). The ladar sensor (94, 100) of the instant invention makes use of a frequency agile transmitter which can rapidly tune from a first transmission frequency to a second transmission frequency, and more if necessary. In a preferred embodiment, the unit cell sampling structure 197 is doubled or tripled, and operated in parallel, and two or three sinewave modulation signals are superimposed on the semiconductor laser transmitter. When using multiple frequency modulation, the individual frequencies should not be simple harmonics of each other; i.e., they should not be related by fractions of low value integers. The ladar sensor (94, 100) in a preferred embodiment makes use of a semiconductor VCSEL laser, enabling the use of shaped single pulses, shaped multiple pulses, shaped and encoded multiple pulses, gated sinewave, gated chirped sinewave, and multi-frequency gated sinewave modulation schemes. In alternative embodiments, a low power semiconductor laser may be electronically modulated, and the resulting modulated optical output amplified by an optical amplifier. By selecting a modulation regime appropriate to the particular scene or objects to be imaged, the flexible modulation capabilities of the present design result in a minimum sized pulsed laser illuminating source with maximum performance in range and resolution.

FIG. 20 is a diagram showing the mating of detector array 154 with readout IC 156. Row amplifiers 206 and column amplifiers 204 allow the output from a unit cell electrical circuit 208 to be output as part of a row output or column output read cycle. All signals to and from readout IC 156 are communicated through bond pads 202 at the periphery of the ROIC 156. Atop each unit cell electrical circuit 208 is an indium bump 210 which is compressed and deformed under temperature and pressure as part of the bonding process which mates detector array 154 to readout IC 156. The indium bump 210 may instead be a low temperature solder bump, which may be reflowed to permanently bond detector array 154 to readout IC 156. The arrow shows the direction of mating, and the top of detector array 154 shows the grid pattern of an optional microlens array comprised of lens elements 200 which collect and focus light into each of the individual detector elements of detector array 154 formed on the anterior surface.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

The invention claimed is:

1. An impact mitigation system for a vehicle, comprising:
a ladar sensor having a ladar sensor output;
a visible light video camera having at least one video output;
a digital processor connected to said ladar sensor output and to said video output and adapted to develop object data therefrom and to make an impact determination;
an impact mitigation device;
an impact mitigation control unit operably connected to activate said impact mitigation device upon an impact determination;
said ladar sensor further comprising
a receiving lens assembly,
a laser transmitter with a modulated laser light output and a diffusing optic for illuminating a scene in a field of view,
a two-dimensional array of light sensitive detectors positioned at a focal plane of said receiving lens assembly, each of said light sensitive detectors with an output producing an electrical response signal from a reflected portion of said modulated laser light output,
a readout integrated circuit with a plurality of unit cell electrical circuits, each of said unit cell electrical circuits having an input connected to one of said light sensitive detector outputs, each unit cell electrical circuit having an electrical response signal demodulator and a range measuring circuit connected to an output of said electrical response signal demodulator, said range measuring circuit further connected to a reference signal providing a zero range reference for the said range measuring circuit,
a detector bias circuit connected to at least one voltage distribution grid of said array of light sensitive detectors, and
a temperature stabilized frequency reference connected to said readout integrated circuit.

2. The impact mitigation system of claim 1 further comprising a duplex radio link connected to the digital processor and adapted to interconnect with a second digital processor in a second vehicle.

3. The impact mitigation system of claim 1 wherein said impact mitigation device is mounted to the vehicle in a location selected from the set of a front bumper, a rear bumper, and a side panel.

4. The impact mitigation system of claim 1 wherein said laser transmitter comprises a vertical cavity surface emitting laser formed in a semiconducting gain medium with at least one element selected from the set of indium, gallium, arsenic, phosphorus.

5. The impact mitigation system of claim 1 wherein said modulated laser light output is modulated with a waveform selected from the set of a single Gaussian pulse profile, multiple Gaussian profile pulses, a single flat-topped pulse profile, multiple flat-topped pulses, a pulsed sinewave, and a chirped sinewave pulse.

6. The impact mitigation system of claim 1 wherein said laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

7. The impact mitigation system of claim 1 wherein said two-dimensional array of light sensitive detectors is mounted directly to said readout integrated circuit.

8. The impact mitigation system of claim 1 wherein said ladar sensor is integrated into a headlight assembly.

9. The impact mitigation system of claim 1 wherein said ladar sensor is integrated into an auxiliary lamp assembly selected from the set of a turn signal, taillight, parking light, mirror assembly, and brake light.

10. A proactive vehicle suspension system comprising:
a ladar sensor having a ladar sensor output and being mountable to a vehicle;

a visible light video camera having a video output and being mountable to the vehicle;

a digital suspension control processor connected to said ladar sensor output and said video output and adapted to develop scene data therefrom and to produce a suspension control signal; and an active suspension component attachable to a suspension arm of a wheel of the vehicle and a chassis of the vehicle, and said active suspension component connected to said digital suspension control processor and adapted to actively raise or lower the wheel in response to the suspension control signal;

said ladar sensor comprising a receiving lens assembly, a laser transmitter with a modulated laser light output and a diffusing optic for illuminating a scene in the field of view, a two-dimensional array of light sensitive detectors positioned at a focal plane of said receiving lens assembly, each of said light sensitive detectors with an output producing an electrical response signal from a reflected portion of said modulated laser light output, a readout integrated circuit with a plurality of unit cell electrical circuits, each of said unit cell electrical circuits having an input connected to one of said light sensitive detector outputs, each said unit cell electrical circuit having an electrical response signal demodulator and a range measuring circuit connected to an output of said electrical response signal demodulator, said range measuring circuit further connected to a reference signal providing a zero range reference for the said range measuring circuit, a detector bias circuit connected to at least one voltage distribution grid of said array of light sensitive detectors, and a temperature stabilized frequency reference connected to said readout integrated circuit.

11. The suspension system of claim 10 wherein said laser transmitter comprises a semiconductor laser formed in a semiconducting gain medium with at least one element selected from the set of indium, gallium, arsenic, phosphorus.

12. The suspension system of claim 10 wherein said modulated laser light output is modulated with a waveform selected from the set of a single Gaussian pulse profile, multiple Gaussian profile pulses, a single flat-topped pulse profile, multiple flat-topped pulses, a pulsed sinewave, and a chirped sinewave pulse.

13. The suspension system of claim 10 wherein said laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

14. The suspension system of claim 10 wherein said two-dimensional array of light sensitive detectors is mounted directly to said readout integrated circuit.

15. The suspension system of claim 10 wherein said control input is selected from the set of a gas pressure, a hydraulic pressure, an electrical current, and an electrical voltage.

16. The system of claim 10 wherein said two-dimensional array of light sensitive detectors is formed in a semiconducting film having an element selected from the set of silicon, indium, gallium, arsenic, phosphorus, aluminum, boron, antimony, magnesium, germanium, and nitrogen.

17. A proactive occupant restraint system for a vehicle, comprising:

a ladar sensor having a ladar sensor output and being mountable to the vehicle;

a visible light video camera having a video output and being mountable to the vehicle;

a digital occupant restraint control processor connected to said ladar sensor output and said video output and adapted to develop scene data therefrom and to produce at least one occupant restraint control signal through an occupant restraint control output;

an occupant restraint subsystem having a plurality of occupant restraint devices, each having an occupant restraint control input connected to the occupant restraint control output of said digital occupant restraint control processor and adapted to deploy upon said occupant restraint control signal;

said ladar sensor comprising a laser transmitter and said laser transmitter with a modulated laser light output and a diffusing optic for illuminating a scene in a field of view, a receiving lens assembly, a two-dimensional array of light sensitive detectors positioned at a focal plane of said receiving lens assembly, each of said light sensitive detectors with an output producing an electrical response signal from a reflected portion of said modulated laser light output, a readout integrated circuit with a plurality of unit cell electrical circuits, each of said unit cell electrical circuits having an input connected to one of said light sensitive detector outputs, each said unit cell electrical circuit having an electrical response signal demodulator and a range measuring circuit connected to an output of said electrical response signal demodulator, said range measuring circuit further connected to a reference signal providing a zero range reference for the said range measuring circuit, a detector bias circuit connected to at least one voltage distribution grid of said array of light sensitive detectors, and a temperature stabilized frequency reference connected to said readout integrated circuit.

18. The proactive occupant restraint system of claim 17 wherein said occupant restraint devices are selected from the set of a seat belt pre-tensioner, a drive side airbag, a passenger side airbag, a side airbag, and a curtain airbag.

19. The proactive occupant restraint system of claim 17 wherein said ladar sensor is integrated into a lamp assembly selected from the set of a headlight, turn signal, taillight, parking light, and brake light.

20. The proactive occupant restraint system of claim 19 wherein said laser transmitter comprises a semiconductor laser formed in a semiconducting gain medium with at least one element selected from the set of indium, gallium, arsenic, and phosphorus.

* * * * *